(12) United States Patent
Asai et al.

(10) Patent No.: US 8,823,588 B2
(45) Date of Patent: Sep. 2, 2014

(54) RADIO POSITIONING AND RANGING SYSTEM AND POSITIONING AND RANGING PROGRAM

(75) Inventors: Masafumi Asai, Kawasaki (JP); Hidenori Sekiguchi, Kawasaki (JP); Akira Fujii, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 318 days.

(21) Appl. No.: 12/795,101

(22) Filed: Jun. 7, 2010

(65) Prior Publication Data

US 2010/0309053 A1 Dec. 9, 2010

(30) Foreign Application Priority Data

Jun. 8, 2009 (JP) ................. 2009-137631

(51) Int. Cl.
*G01S 11/08* (2006.01)
*G01S 1/24* (2006.01)
*G01S 5/14* (2006.01)
*G01S 5/02* (2010.01)
*G01S 11/06* (2006.01)
*G01S 5/06* (2006.01)

(52) U.S. Cl.
CPC ............. *G01S 11/06* (2013.01); *G01S 5/0221* (2013.01); *G01S 5/06* (2013.01); *G01S 5/14* (2013.01); *G01S 11/08* (2013.01)
USPC ............................ 342/387; 342/386; 342/458

(58) Field of Classification Search
CPC ............. G01S 1/02; G01S 1/04; G01S 1/042; G01S 1/045; G01S 1/54; G01S 1/56; G01S 1/64; G01S 5/00; G01S 5/02; G01S 5/06; G01S 3/45; G01S 3/50
USPC ........................... 342/458, 387, 386
See application file for complete search history.

(56) References Cited

U.S. PATENT DOCUMENTS 3,817,620 A * 6/1974 Suzaki et al. ............... 356/3.12
6,571,082 B1 * 5/2003 Rahman et al. ........... 455/67.11
(Continued)

FOREIGN PATENT DOCUMENTS

JP 9-304532 11/1997
JP 2005-265461 9/2005
(Continued)

OTHER PUBLICATIONS

Japanese Office Action mailed Nov. 20, 2012 issued in corresponding Japanese Patent Application No. 2009-137631.
(Continued)

*Primary Examiner* — Gregory C Issing
*Assistant Examiner* — Chuong P Nguyen
(74) *Attorney, Agent, or Firm* — Staas & Halsey LLP

(57) ABSTRACT

A positioning and ranging system includes a transmitter transmits a plurality of impulses; and a receiver receives the impulses; the receiver includes an initial detection unit records a sensing time of a first impulse among a plurality of impulses transmitted by the transmitter; a sensing margin detection unit for detecting a sensing margin being a difference between a field intensity of the first impulse and a reception limit field intensity of the receiver; a correction unit identifies a sensing error differential time based on a given relationship between the sensing margin and the sensing error differential time, and corrects the sensing time detected by the initial detection unit using the identified sensing error differential time; the system measures a distance between the transmitter and the receiver and a position of the transmitter based on a time the transmitter transmits the first impulse and a time the receiver receives the impulse.

7 Claims, 23 Drawing Sheets

(56) References Cited

U.S. PATENT DOCUMENTS

| | | | |
|---|---|---|---|
| 7,010,973 B2 * | 3/2006 | Bartoli et al. | 73/290 V |
| 7,148,841 B2 | 12/2006 | Yoneda et al. | |
| 2005/0146705 A1 * | 7/2005 | Lei et al. | 356/5.01 |
| 2006/0203936 A1 | 9/2006 | Roovers et al. | |
| 2008/0291024 A1 | 11/2008 | Zhang et al. | |

FOREIGN PATENT DOCUMENTS

| | | |
|---|---|---|
| JP | 2005-274363 | 10/2005 |
| JP | 2006-352810 | 12/2006 |
| JP | 2008-39738 | 2/2008 |
| JP | 2008-128728 | 6/2008 |
| JP | 2008-202996 | 9/2008 |
| JP | 2008-292491 | 12/2008 |
| JP | 2009-68924 | 4/2009 |
| WO | 2004/091161 A1 | 10/2004 |

OTHER PUBLICATIONS

Japanese Office Action issued Oct. 1, 2013 in corresponding Japanese Application No. 2009-137631.

* cited by examiner

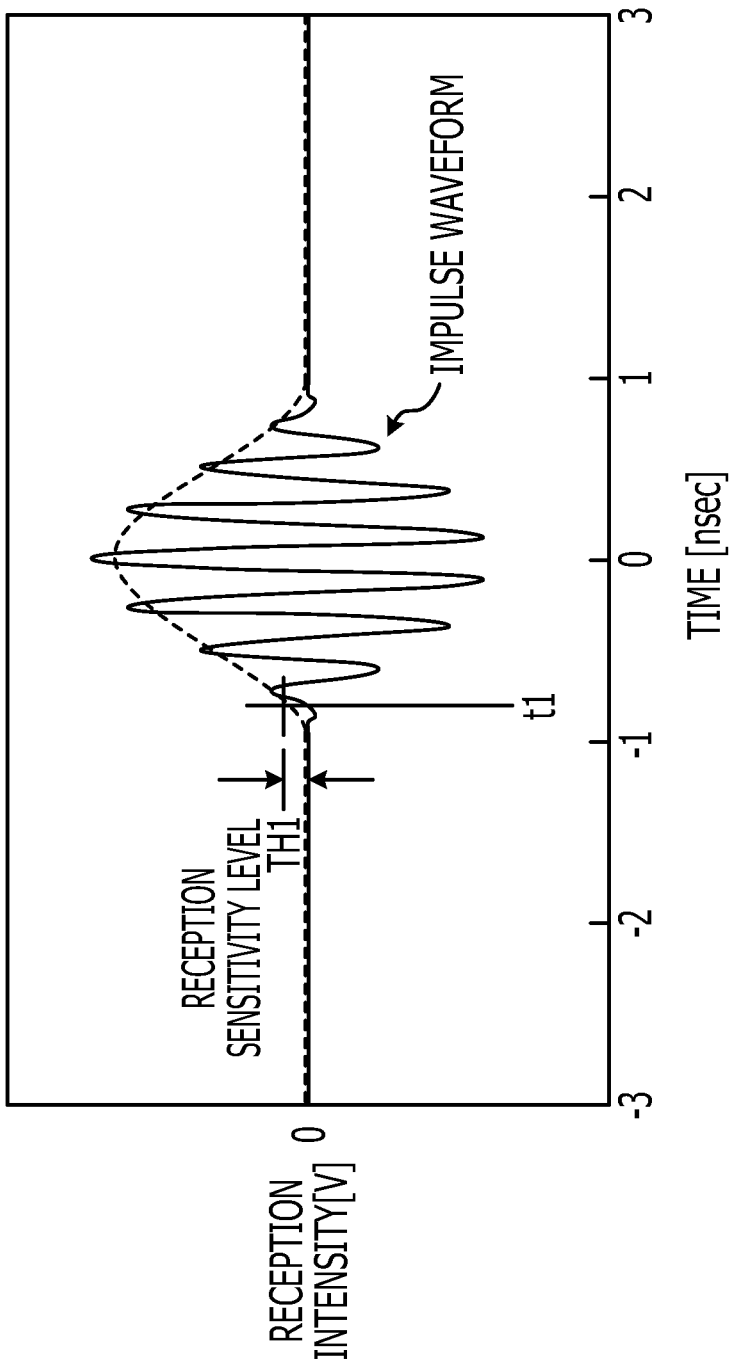

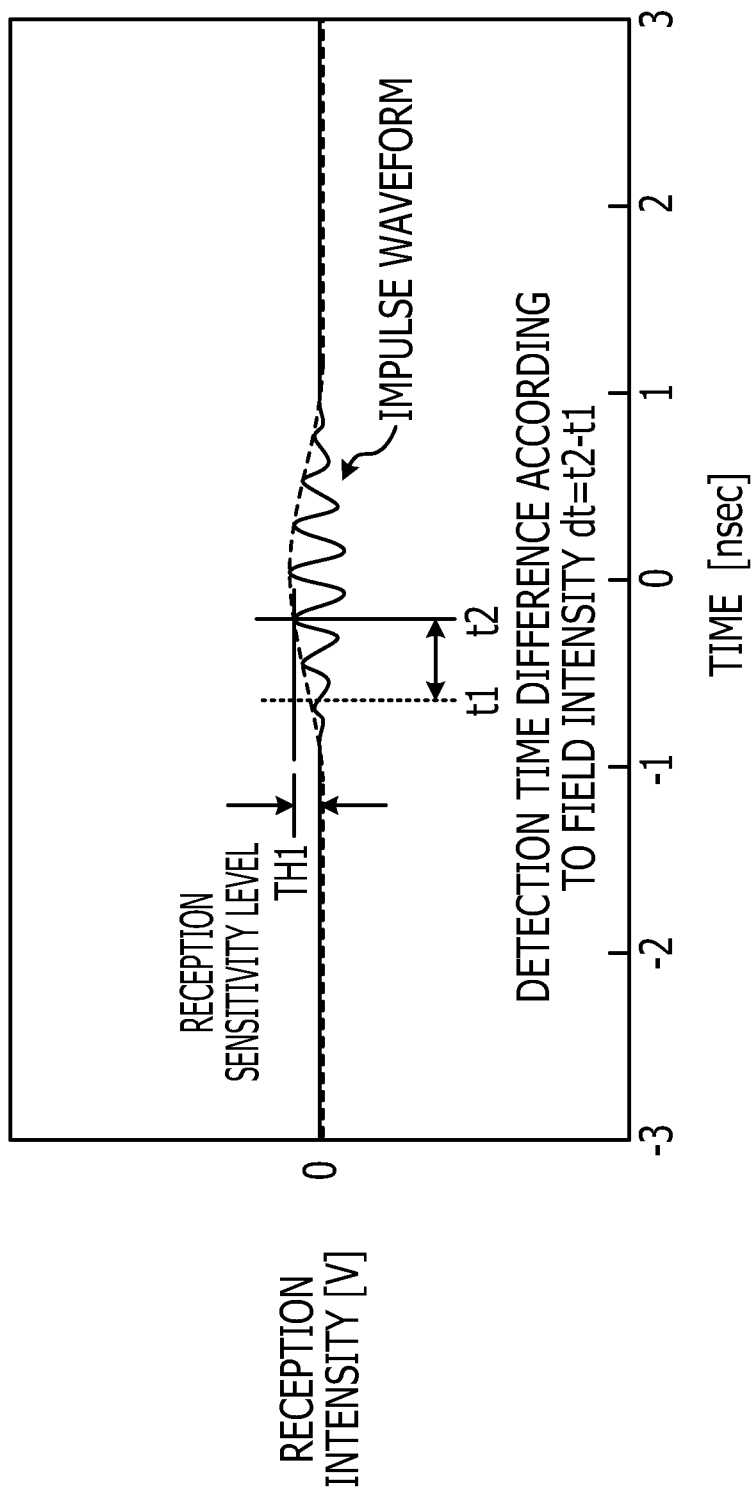

RADIO POSITIONING AND RANGING SYSTEM AND POSITIONING AND RANGING PROGRAM

CROSS-REFERENCE TO RELATED APPLICATIONS

This application is based upon and claims the benefit of priority from the prior Japanese Patent Application No. 2009-137631 filed on Jun. 8, 2009, the entire contents of which are incorporated herein by reference.

FIELD

The present disclosure relates to a radio positioning and ranging system, and a positioning and ranging program.

BACKGROUND

Conventionally, a technique is known that measures the distance from a base station to a mobile terminal and a position where a known mobile terminal is located. An example of the positioning and ranging technique is a technique that measures the distance between a base station and a mobile terminal based on the field intensity of continuous waves transmitted and received between the base station and the mobile terminal. The technique utilizes a characteristic that the longer the distance a radio wave propagates; the more the intensity of radio wave attenuates. However, accuracy of the positioning and ranging is low, because the field intensity of the continuous wave changes due to multipath interference.

Another example of the positioning and ranging technique is a technique that uses an impulse. For example, a base station senses an impulse transmitted by a mobile terminal and positioning and ranging is performed based on the time when the base station senses the impulse. Multipath interference is less likely to occur in the impulse compared with a continuous wave. Therefore, the technique that uses an impulse achieves the positioning and ranging with higher accuracy compared with the technique that uses a continuous wave.

However, there is a disadvantage in which the accuracy of the positioning and ranging is still low even in the above technique using an impulse. For example, fluctuation of the field intensity of an impulse causes an error in the time when the base station senses the impulse, and thereby results of the positioning and ranging may also fluctuate.

The FIGS. 22 and 23 illustrate examples of impulse waveforms. Here, it is assumed that the base station receives impulses illustrated in FIGS. 22 and 23 at substantially the same time. A reception sensitivity level of the base station is assumed to be "TH1." In other words, the base station senses an impulse with field intensity that reaches "TH1."

Under the condition, when the base station receives the impulse illustrated in FIG. 22, the base station senses the impulse, for example, at time t1. This is because the field intensity of the impulse illustrated in FIG. 22 reaches the reception sensitivity level TH1 at the time t1. On the other hand, when the base station receives the impulse illustrated in FIG. 23, the base station senses the impulse, for example, at time t2. This is because the field intensity of the impulse illustrated in FIG. 23 reaches the reception sensitivity level TH1 at the time t2.

In other words, even when the distance between the base station and the mobile terminal is substantially the same, the base station senses the impulse at different times depending on the field intensity. This leads to a disadvantage in which results of the positioning and ranging fluctuate depending on the field intensity of the impulse.

Recently, there is a receiver that outputs a received impulse to a plurality of comparators, and determines a shape of an impulse waveform based on the time sensed by each comparator. However, the receiver has disadvantages in which an impulse with weak field intensity may not be processed because the impulse is diverged and the circuit becomes complicated.

SUMMARY

According to aspects of embodiments, a positioning and ranging system includes a transmitter that transmits a plurality of impulses; and a receiver that receives the plurality of impulses; wherein, the receiver that receives the plurality of impulses includes an initial detection unit that records a sensing time of a first impulse among a plurality of impulses transmitted by the transmitter; a sensing margin detection unit for detecting a sensing margin that is a difference between a field intensity of the first impulse and a reception limit field intensity of the receiver; and a correction unit that identifies a sensing error differential time based on a given relationship between the sensing margin and the sensing error differential time, and corrects the sensing time detected by the initial detection unit using the identified sensing error differential time; wherein, the radio positioning and ranging system measures a distance between the transmitter and the receiver and a position of the transmitter based on a time when the transmitter transmits the first impulse and a time when the receiver receives the impulse.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 22 illustrates an example of an impulse waveform; and

FIG. 23 illustrates another example of an impulse waveform.

DESCRIPTION OF EMBODIMENTS

Hereinafter, detailed embodiments of the radio positioning and ranging system, and the positioning and ranging program disclosed by the present application will be described by referring to the accompanying drawings. The radio positioning and ranging system, and the positioning and ranging program of the present application are not restricted by the embodiments.

First Embodiment

Figure 1:
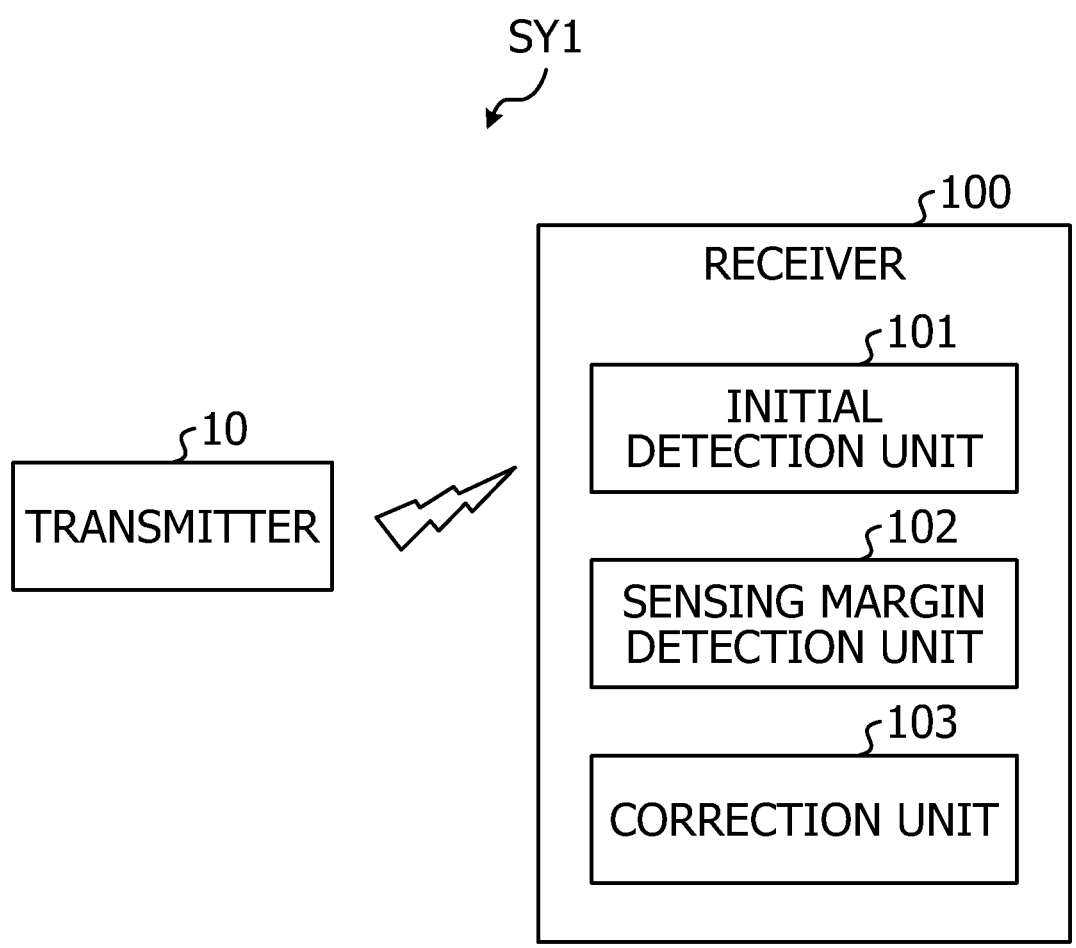
FIG. 1 illustrates an example of components in a basic configuration of a radio positioning and ranging system according to a first embodiment.

FIG. 1 illustrates an example of components in a basic configuration of a radio positioning and ranging system according to the first embodiment. As illustrated in FIG. 1, the radio positioning and ranging system SY1 according to the first embodiment may include a transmitter 10 and a receiver 100 that are positioning and ranging devices. The transmitter 10 transmits an impulse to the receiver 100. The receiver 100 receives the impulse transmitted by the transmitter 10.

In the example illustrated in FIG. 1, the radio positioning and ranging system SY1 measures a distance between the transmitter 10 and the receiver 100 based on a time when the transmitter 10 transmits the impulse and a time when the receiver 100 senses the impulse.

In particular, the receiver 100 according to the first embodiment corrects a time when the receiver 100 senses the impulse (hereinafter, referred to as an "impulse sensing time"). For example, as illustrated in FIG. 1, the receiver 100 may include an initial detection unit 101, a sensing margin detection unit 102 and a correction unit 103 and the impulse sensing time is corrected by various processing performed by the respective units.

For example, the initial detection unit 101 records the impulse sensing time that is a time when a given impulse for positioning and ranging is sensed among impulses transmitted by the transmitter 10.

The sensing margin detection unit 102 detects a difference between a field intensity of the impulse received from the transmitter 10 and a reception limit field intensity that is a limit of the field intensity of the impulse that may be received by the receiver 100. Hereinafter, a difference between the field intensity of an impulse received from the transmitter 10 and the reception limit field intensity of the receiver 100 is described as a "sensing margin."

Based on a given relationship between the sensing margin and a time error when an impulse is sensed (hereinafter, referred to as a "sensing error differential time"), the correction unit 103 identifies the sensing error differential time for the sensing margin detected by the sensing margin detection unit 102. The correction unit 103 corrects the impulse sensing time detected by the initial detection unit 101 using the identified sensing error differential time.

The relationship between the sensing margin and the sensing error differential time is information that indicates the relationship between the sensing margin when an impulse is received and changes in time when the impulse is sensed by the receiver. For example, as illustrated in FIGS. 22 and 23, the impulse sensing time changes depending on the field intensity of the impulse. The relationship between the sensing margin and the sensing error differential time is information that indicates changes in the impulse sensing time in association with the sensing margin.

The reception limit field intensity may differ depending on receivers. However, when sensing margins are substantially constant, the sensing error differential time may be substantially the same. For example, it is assumed that the reception limit field intensity of the receiver 100A is 1 dBm, while the reception limit field intensity of the receiver 100B is 2 dBm. Moreover, when the receiver 100A receives an impulse with field intensity 6 dBm, and the sensing error differential time by the receiver 100A is assumed to be 1 ns. In this case, the sensing margin of the receiver 100A is expressed by:

6 dBm−1 dBm=5 dBm

When the receiver 100B receives an impulse with field intensity 7 dBm, the sensing error differential time is approximately 1 ns. This is because the sensing margin of the receiver 100B is 7 dBm−2 dBm=5 dBm, and is substantially the same as the sensing margin of the receiver 100A described in the above example.

Accordingly, the receiver 100 may identify the sensing error differential time by detecting the sensing margin. Thus, during the manufacturing process of the receiver 100, the sensing error differential time is measured while changing sensing margins and information that indicates the measured "relationship between the sensing margin and the sensing error differential time" is stored in the receiver 100 according to the first embodiment. The receiver 100, as described using FIG. 1, corrects the impulse sensing time based on the relationship between the sensing margin and the sensing error differential time. Accordingly, the receiver 100 may correct the sensing error differential time that changes according to the field intensity of an impulse.

As described above, in the radio positioning and ranging system SY1 according to the first embodiment, the receiver 100 stores the impulse sensing time when the receiver 100 receives the impulse, and calculates the sensing margin that is a difference between the field intensity of the received impulse and the reception limit field intensity of the receiver 100. The receiver 100 identifies the sensing error differential time for the sensing margin based on the given relationship between sensing margin and the sensing error differential time, and corrects the impulse sensing time using the identified sensing error differential time. In other words, the radio positioning and ranging system SY1 corrects an impulse detection time that changes according to the field intensity of the impulse. The positioning and ranging may be performed with high accuracy by configuring the positioning and ranging system using the components of the basic configuration.

Second Embodiment

In the second embodiment, an example will be described in which the positioning and ranging system described in the first embodiment is applied to the positioning and ranging system that employs Time Difference Of Arrival (TDOA) method. In the second embodiment, an example will be described in which a mobile station is used as the transmitter 10 illustrated in FIG. 1 and a base station is used as the receiver 100 illustrated in FIG. 1.

Figure 2:
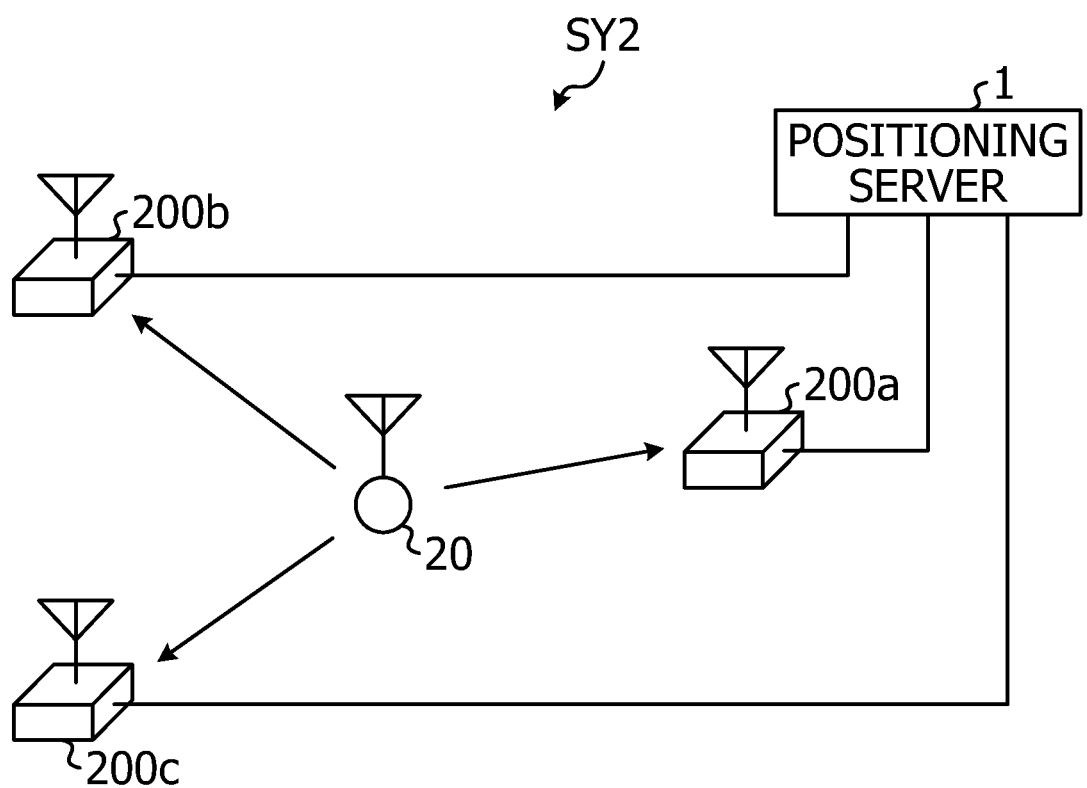
FIG. 2 illustrates a configuration example of a radio positioning and ranging system according to a second embodiment.

A system may be assumed in which a positioning server side calculates a position of the mobile terminal. FIG. 2 illustrates a configuration example of a radio positioning and ranging system according to a second embodiment. The radio positioning and ranging system SY2 illustrated in FIG. 2 may employ a TDOA method.

As illustrated in FIG. 2, the radio positioning and ranging system SY2 may include a mobile station 20, base stations 200*a* to 200*c*, and a positioning server 1. Hereunder, the base stations 200*a* to 200*c* may be collectively referred to as a base station 200 when the description does not identify any particular base station.

The mobile station 20 transmits impulses to the base stations 200*a* to 200*c*. The base stations 200*a* to 200*c* receive impulses transmitted by the mobile station 20. At this time, the base stations 200*a* to 200*c* correct an impulse sensing time as in the receiver 100 described in the first embodiment.

The positioning server 1 acquires the impulse sensing time corrected by the base stations 200*a* to 200*c* and performs positioning position coordinates of the mobile station 20 based on the acquired impulse sensing time. For example, the positioning server 1 obtains a difference of a propagation time between two base stations based on the impulse sensing time at the base stations 200*a* to 200*c*, and thereby obtains a plurality of hyperbolic curves. The positioning server 1 calculates a position that corresponds to an intersection point of the plurality of hyperbolic curves as position coordinates of the mobile station 20.

As described above, the base stations 200*a* to 200*c* correct the impulse sensing time that fluctuates according to a field intensity of an impulse. The positioning server 1 measures a distance from the base stations 200*a* to 200*c* to the mobile station 20 based on the corrected impulse sensing time and perform positioning of position coordinates of the mobile station 20. Accordingly, the radio positioning and ranging system SY2 according to the second embodiment may perform positioning and ranging with high accuracy.

Figure 3:
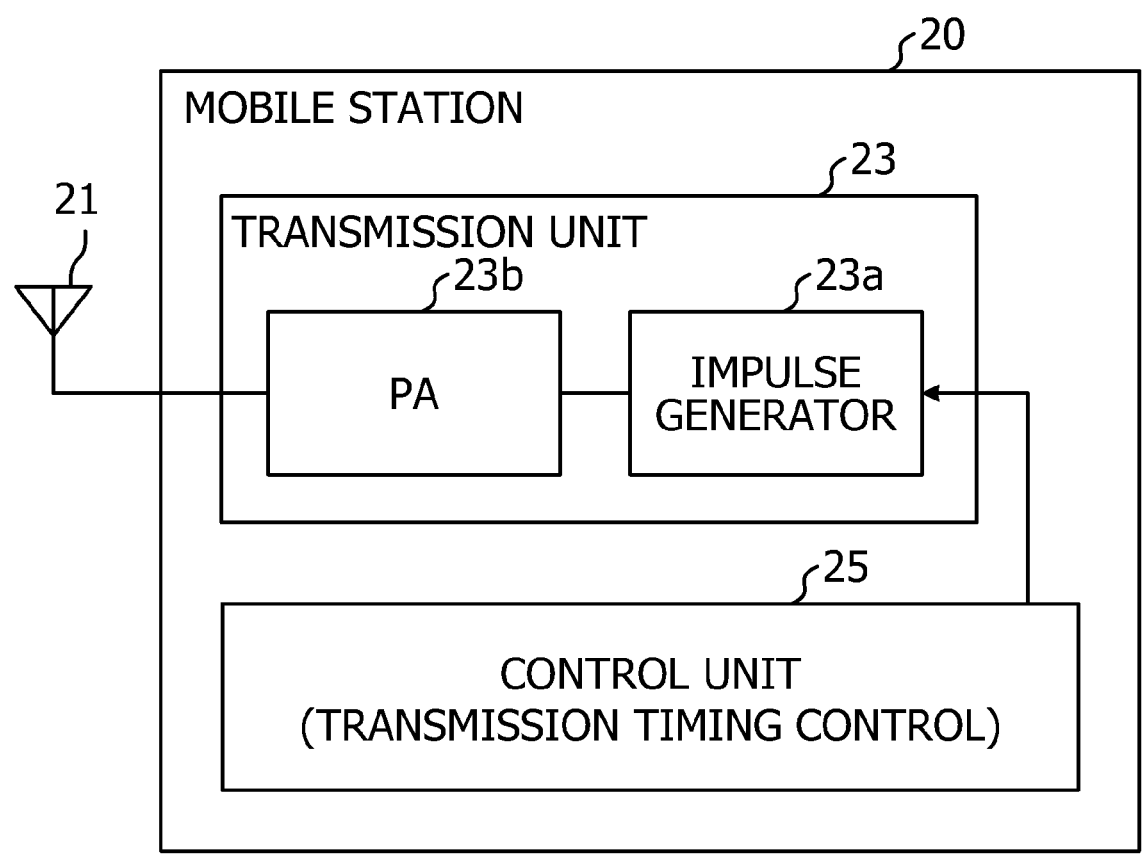
FIG. 3 illustrates a configuration example of a mobile station according to the second embodiment.

FIG. 3 illustrates a configuration example of the mobile station 20 according to the second embodiment. As illustrated in FIG. 3, the mobile station 20 according to the second embodiment may include an antenna 21, a transmission unit 23, and a control unit 25.

The antenna 21 transmits radio waves to an external device. For example, the antenna 21 transmits radio waves to the base stations 200*a* to 200*c*.

The transmission unit 23 generates data for transmitting to the external device and transmits the generated data to the external device as radio wave. In particular, the transmission unit 23 of the mobile station 20 according to the second embodiment may include an impulse generator 23*a* and a power amplifier (PA) 23*b*.

The impulse generator 23*a* generates an impulse under a control of the control unit 25, which will be described later. The PA 23*b* amplifies the impulse generated by the impulse generator 23*a*. In this manner, the transmission unit 23 transmits the impulse according to an instruction from the control unit 25. The transmission unit 23 transmits an impulse with a given frame unit.

Figure 4:
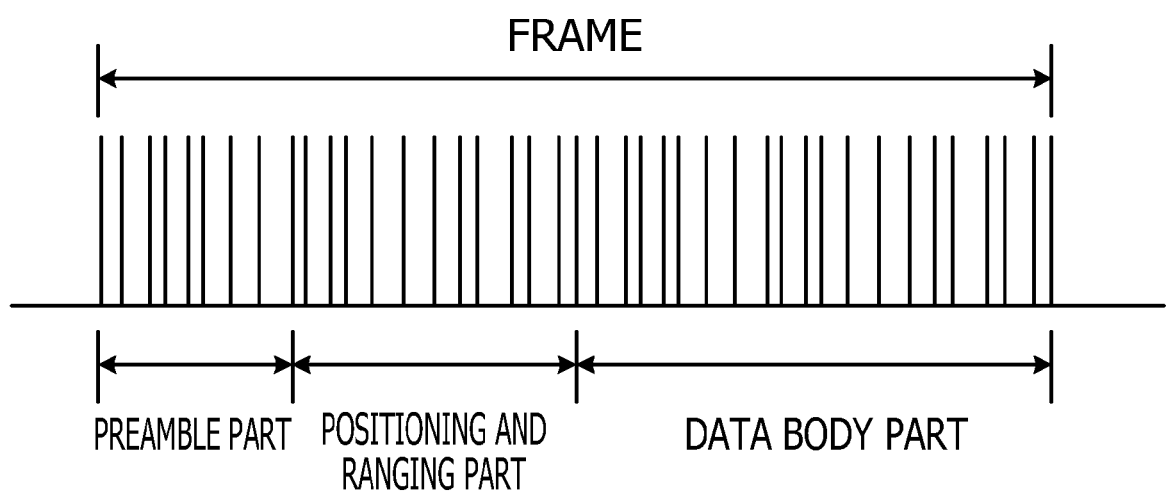
FIG. 4 illustrates an example of a frame transmitted by the mobile station according to the second embodiment.

FIG. 4 illustrates an example of a frame transmitted by the mobile station 20 according to the second embodiment. In the example illustrated in FIG. 4, a frame transmitted by the transmission unit 23 includes a preamble part, a positioning and ranging part and a data body part. The preamble part is an impulse for synchronization. The positioning and ranging part is an impulse for positioning and ranging. The data body part is an impulse that indicates user data, etc.

In regard to the explanation for FIG. 3, the control unit 25 controls transmissions by the mobile station 20. For example, the control unit 25 controls the impulse generator 23*a* so that an impulse is transmitted with a given timing.

Figure 5:
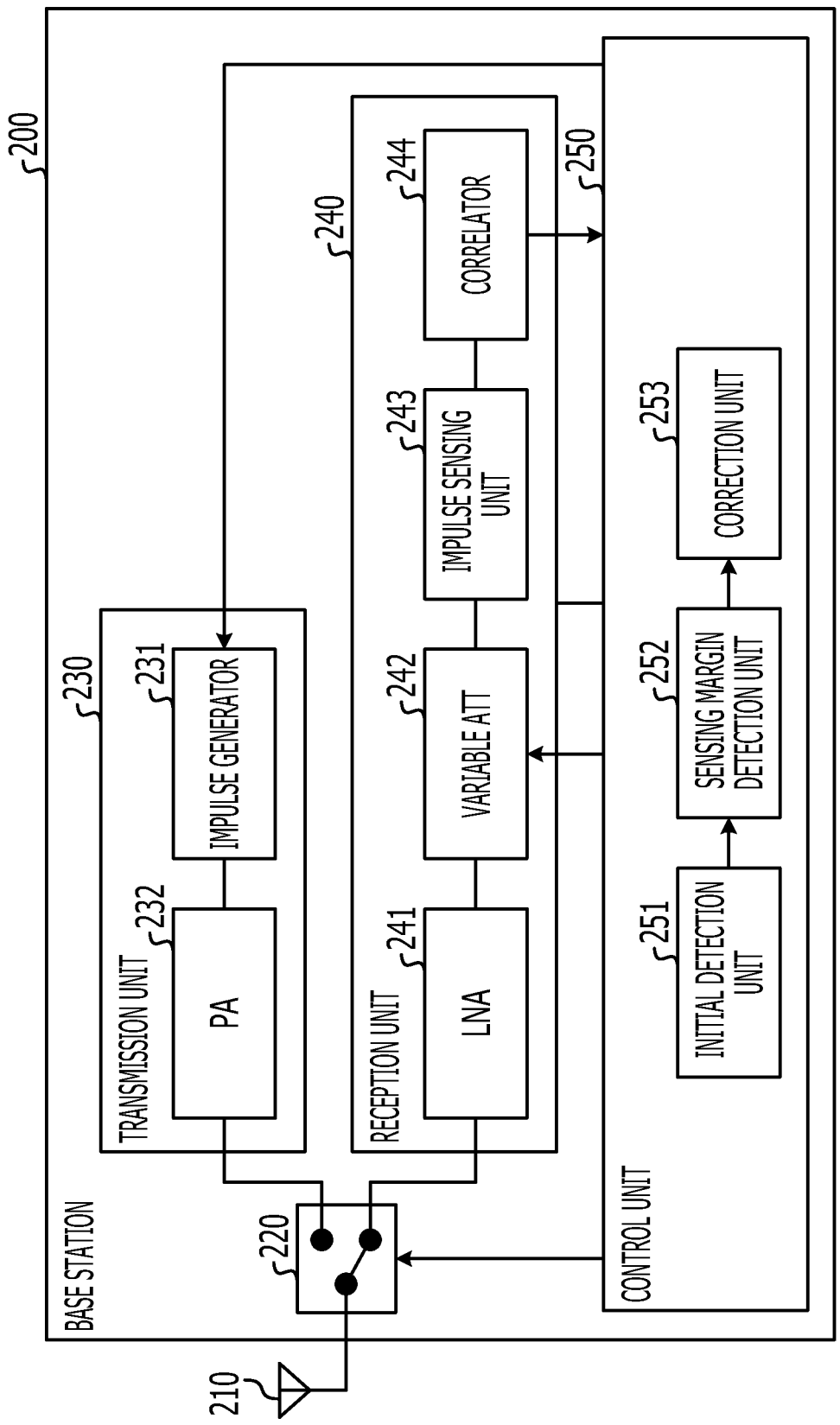
FIG. 5 is a configuration example of a base station according to the second embodiment.

FIG. 5 is a configuration example of the base station 200 according to the second embodiment. As illustrated in FIG. 5, the base station 200 according to the second embodiment may include an antenna 210, a switch 220, a transmission unit 230, a reception unit 240, and a control unit 250.

The antenna 210 transmits and receives radio waves to and from an external device. For example, the antenna 210 transmits and receives radio waves to and from the mobile station 20 and the external device. The switch 220 switches coupling depending on whether the base station 200 performs the transmission processing or the reception processing. The example in FIG. 5 illustrates a state in which the base station 200 performs the reception processing and the switch 220 may couple the antenna 210 and the reception unit 240.

The transmission unit 230 transmits data to the external device through the antenna 210. For example, the transmission unit 230 may include an impulse generator 231 and a PA 232. The impulse generator 231 generates an impulse under a control of the control unit 250, which will be described later. The PA 232 amplifies the impulse generated by the impulse generator 231.

The reception unit 240 receives radio waves from the external device and performs various processing. Particularly, the reception unit 240 of the base station 200 according to the second embodiment may include a low noise amplifier (LNA) 241, a variable attenuator (AU) 242, an impulse sensing unit 243, and a correlator 244.

The LNA 241 amplifies a radio wave received by the antenna 210. For example, the LNA 241 amplifies an impulse transmitted to the mobile station 20, and outputs the amplified impulse to the variable ATT 242.

The variable ATT 242 attenuates the field intensity of the impulse amplified by the LNA 241. For example, an ATT value (attenuation value) is set to the ATT 242 and the larger the ATT value, the intensity of the radio wave is attenuated further. The ATT value that is set to the variable ATT 242 is controlled by a sensing margin detection unit 252.

The impulse sensing unit 243 senses the impulse that passes through the variable ATT 242. For example, the impulse sensing unit 243 senses an impulse that is input from the variable ATT 242 when the field intensity of the impulse reaches a given reception sensitivity level. The impulse sensing unit 243 outputs a pulse when the impulse sensing unit 243 senses the impulse. The impulse sensing unit 243 does not output a pulse when the impulse sensing unit 243 does not sense the impulse.

For example, a reception sensitivity level of the impulse sensing unit 243 is assumed to be −12 dBm. The field intensity of an impulse before passing through the variable ATT 242 is assumed to be −10 dBm. Under the condition, when an ATT value of the variable ATT 242 is 0 dBm, the impulse sensing unit 243 is input with an impulse of −10 dBm, and the impulse sensing unit 243 senses the impulse and outputs a pulse. On the other hand, when an ATT value of the variable ATT 242 is 3 dBm, the impulse sensing unit 243 is input with an impulse of −13 dBm, and the impulse sensing unit 243 does not sense the impulse and does not output a pulse.

The correlator 244 performs processing for synchronizing reception timing using a preamble part of a frame.

The control unit 250 controls the entire base station 200. For example, the control unit 250 determines whether the base station 200 performs transmission processing or reception processing and controls switching a coupling of the switch 220. Another example is the control unit 250 transmits an impulse with a given timing by controlling the impulse generator 231.

Moreover, the control unit 250 of the base station 200 according to the second embodiment corrects the impulse sensing time. For example, the control unit 250 may include an initial detection unit 251, a sensing margin detection unit 252 and a correction unit 253.

The initial detection unit 251 senses the time of an impulse in a positioning and ranging part sensed first among impulses transmitted by the mobile station 20 by the impulse sensing unit 243 and stores the impulse sensing time.

The sensing margin detection unit 252 detects a sensing margin that is the difference between the field intensity of an impulse received from the mobile station 20 and reception limit field intensity of the base station 200. For example, the sensing margin detection unit 252 gradually increases an ATT value of the variable ATT 242 and gradually attenuates the impulse transmitted by the mobile station 20. The sensing margin detection unit 252 determines whether or not the impulse sensing unit 243 may sense the attenuated impulse. When the impulse sensing unit 243 does not sense the impulse, the sensing margin detection unit 252 detects a substantially maximum ATT value of the variable ATT 242 with which the impulse is sensed by the impulse sensing unit 243 as a sensing margin.

Figure 6:
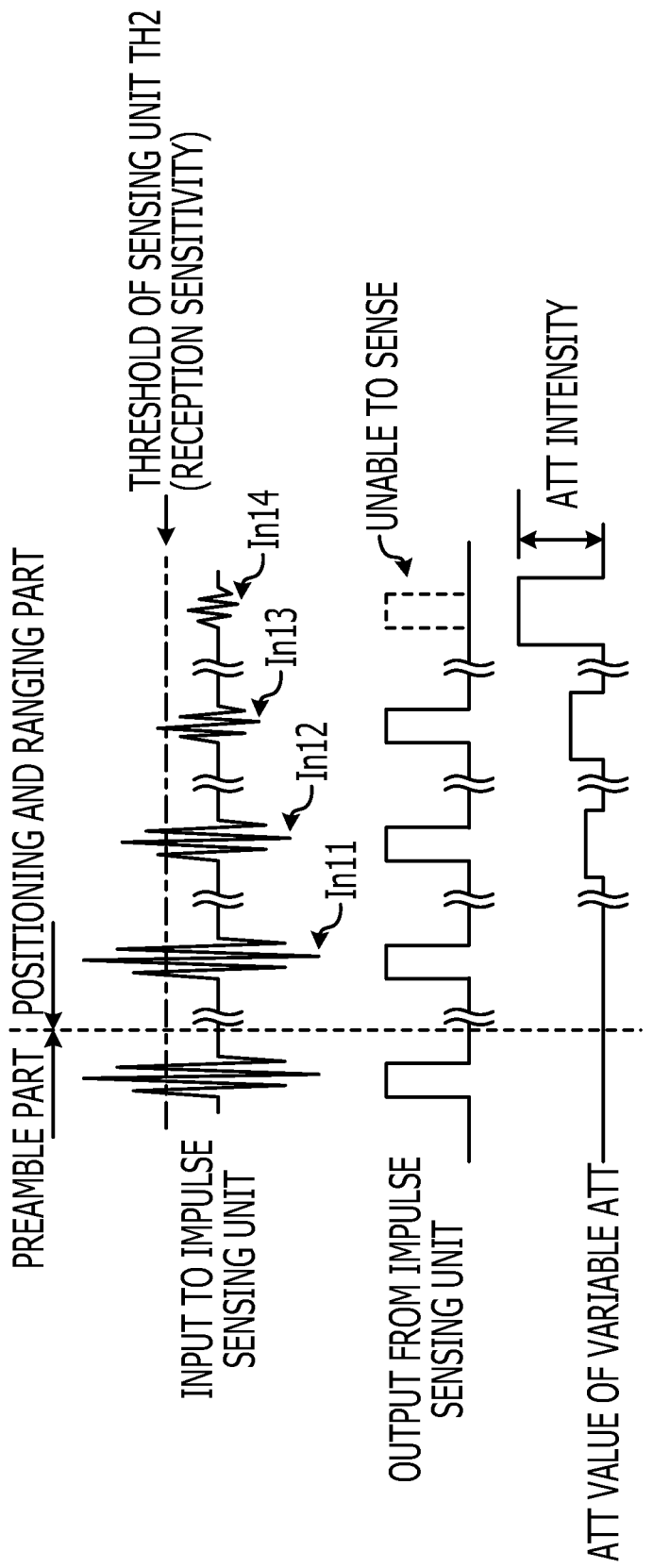
FIG. 6 illustrates an example of processing by an initial detection unit and a sensing margin detection unit illustrated in FIG. 5.

FIG. 6 illustrates an example of processing by an initial detection unit 251 and a sensing margin detection unit 252 illustrated in FIG. 5. The top part of FIG. 6 illustrates an example of a pulse that is input to the impulse sensing unit 243. The middle part of FIG. 6 illustrates an example of a pulse that is output from the impulse sensing unit 243. The bottom part of FIG. 6 illustrates an example of an ATT value set to the variable ATT 242. A reception sensitivity level of the impulse sensing unit 243 is assumed to be TH2 in the example illustrated in FIG. 6.

The sensing margin detection unit 252 initializes an ATT value of the variable ATT 242 to 0. As in the example illustrated in FIG. 6, the impulse sensing unit 243 is input with an impulse In11 as an impulse in a positioning and ranging part. The field intensity of the impulse In11 may reach a reception sensitivity level TH2 and the impulse sensing unit 243 senses the impulse In11. At this time, the initial detection unit 251 senses the impulse In11 and stores the time (impulse sensing time).

As illustrated in the bottom part of FIG. 6, the sensing margin detection unit 252 sets a given value to an ATT value of the variable ATT242. The variable ATT242 to which the ATT value is set attenuates the field intensity of the impulse that is input from the LNA 241, and outputs the attenuated impulse In12 to the impulse sensing unit 243. The sensing margin detection unit 252 determines whether or not the impulse sensing unit 243 may sense the impulse In12 or not. In the example illustrated in FIG. 6, the impulse sensing unit 243 senses the impulse In12 with the field intensity that reaches the reception sensitivity level TH2.

The sensing margin detection unit 252 sets a value larger than the previously set value to the ATT value of the variable ATT 242 because the impulse sensing unit 243 senses the impulse In12. The variable ATT 242 to which the ATT value is set outputs an impulse In13 to the impulse sensing unit 243. In the example illustrated in FIG. 6, the impulse sensing unit 243 senses the impulse In13 with the field intensity that reaches the reception sensitivity level TH2.

The sensing margin detection unit 252 sets a value larger than the previously set value to an ATT value of the variable ATT242. The variable ATT 242 to which the ATT value is set outputs an impulse In14 to the impulse sensing unit 243. In the example illustrated in FIG. 6, the impulse sensing unit 243 does not sense the impulse In14 because the field intensity of the impulse In14 does not reach the reception sensitivity level TH2.

The sensing margin detection unit 252 detects the ATT value with which the variable ATT 242 senses the impulse In13 as a sensing margin because the impulse sensing unit 243 does not sense the impulse 14. This is because the impulse sensing time used by positioning and ranging is the time at which the impulse In11 is received and the reception limit field intensity is the field intensity of the impulse In13. In other words, the difference between the field intensity of the impulse In11 and that of the impulse In13 is a sensing margin and the sensing margin is an ATT value with which the variable ATT242 senses the impulse In13.

For example, the field intensity of the impulse In11 is assumed to be −10 dBm. Moreover, the sensing margin detection unit 252 sets a value which is larger than the previously set value by the amount of 1 dBm to an ATT value of the variable ATT242. In this case, the field intensity of the impulse In12 is −11 dBm and the field intensity of the impulse In13 is −13 dBm.

Under the condition illustrated in the example in FIG. 6, the impulse sensing unit 243 does not sense the impulse In14 and the reception limit field intensity of the base station 200 is the field intensity of the impulse In13, −12 dBm. In other words, the sensing margin is 2 dBm that corresponds to a difference between the field intensity of the impulse In11, −10 dBm and reception limit field intensity, −12 dBm. This is an ATT value of 2 dBm with which the variable ATT 242 senses the impulse In13.

The correction unit 253 identifies the sensing error differential time for the sensing margin calculated by the sensing margin detection unit 252 based on the relationship between the sensing margin and the sensing error differential time.

Figure 7:
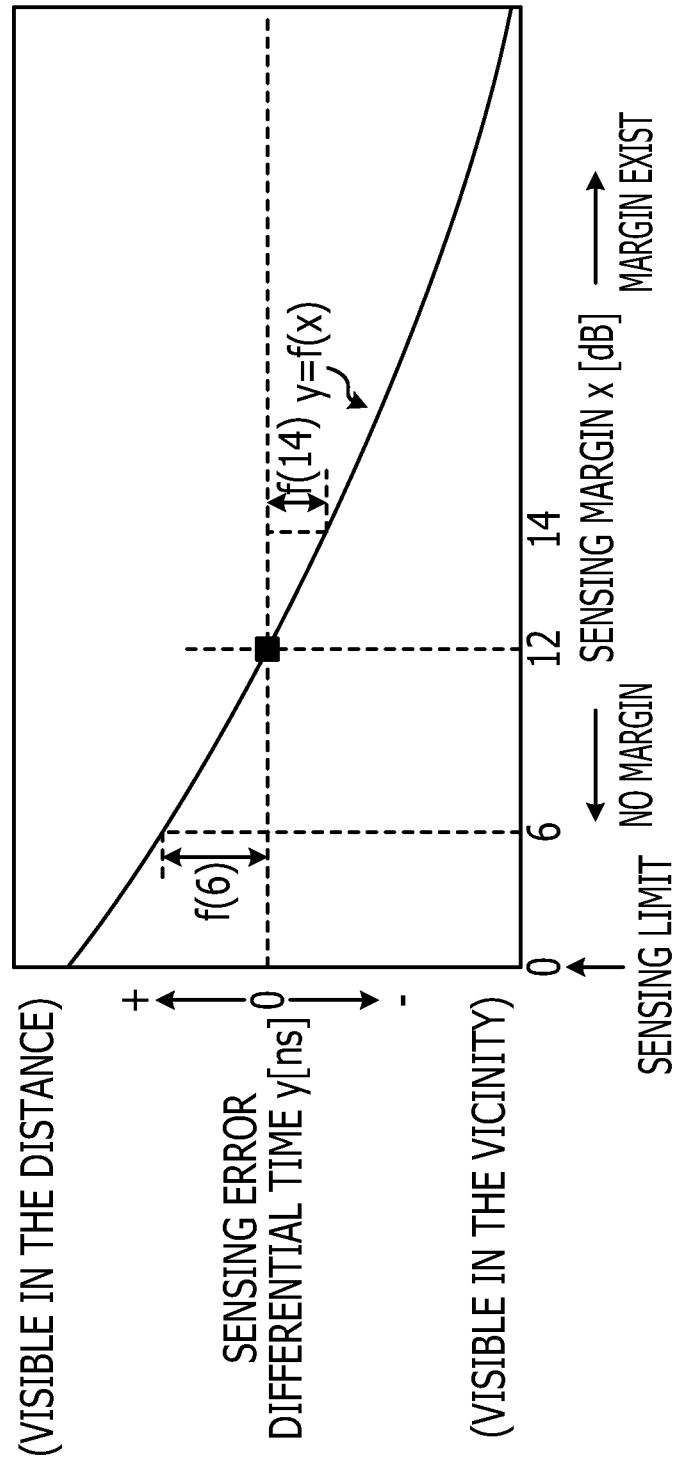
FIG. 7 illustrates an example of a relationship between a sensing margin and sensing error differential time.

FIG. 7 illustrates an example of the relationship between the sensing margin and the sensing error differential time. In the example illustrated in FIG. 7, a standard is assumed to be when the sensing margin is 12 dB. For example, the sensing error differential time may be 0 when the sensing margin is 12 dB. The base station 200 is adjusted at manufacturing so that the sensing error differential time may not be caused when the sensing margin is 12 dB.

When the sensing margin is smaller than 12 dB, the base station 200 senses an impulse at the time later than when the sensing margin is 12 dB. Thus, as illustrated in FIG. 7, when the sensing margin is smaller than 12 dB, the sensing error differential time becomes a positive value. Moreover, when the sensing margin is larger than 12 dB, the base station 200 senses an impulse at a time earlier than when the sensing margin is 12 dB. Hence, as illustrated in FIG. 7, the sensing error differential time becomes a negative value when the sensing margin is smaller than 12 dB.

As described above, when the sensing margin is 12 dB, the base station 200 is adjusted so that the sensing error differential time is not caused. Therefore, when the sensing margin is not 12 dB at reception of an impulse, the sensing error differential time is caused at the impulse sensing time. Accordingly, the correction unit 253 identifies the sensing error differential time for the sensing margin calculated by the sensing margin detection unit 252 and corrects the impulse sensing time.

For example, the correction unit 253 is assumed to retain information that indicates a relationship between the sensing margin and the sensing error differential time illustrated in FIG. 7. At this time, when the sensing margin calculated by the sensing margin detection unit 252 is 6 dB, the correction unit 253 calculates the sensing error differential time f (6) as in the example illustrated in FIG. 7. The correction unit 253 subtracts an absolute value of the sensing error differential time f (6) from the impulse sensing time detected by the initial detection unit 251. For example, when the sensing margin calculated by the sensing margin detection unit 252 is 14 dB, the correction unit 253, as the example illustrated in FIG. 7, calculates the sensing error differential time f (14), and adds an absolute value of the sensing error differential time f (14) to the impulse sensing time.

Figure 8:
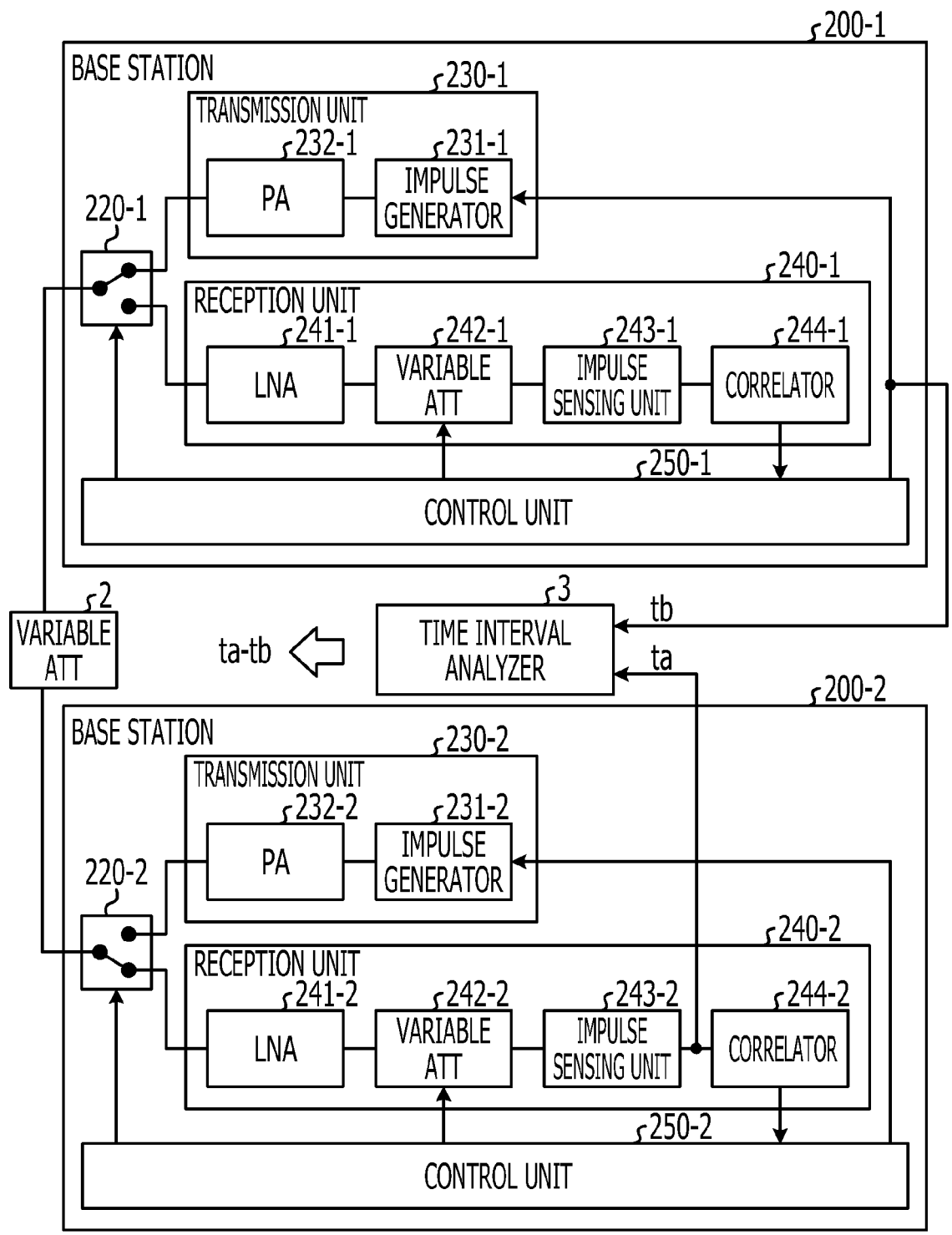
FIG. 8 illustrates an example of calculation processing for the relationship between the sensing margin and the sensing error differential time.

FIG. 8 illustrates an example of calculation processing for a relationship between the sensing margin and the sensing error differential time. As described above, information that indicates the relationship between the sensing margin and the sensing error differential time is calculated during manufacturing process of the base station 200.

For example, when the relationship between the sensing margin and the sensing error differential time is calculated, two base stations that are the base station 200-1 and the base station 200-2 are coupled with a wire through a variable ATT2. Moreover, a time interval analyzer 3 is coupled to the base stations 200-1 and 200-2. When the relationship between the sensing margin and the sensing error differential time is calculated, "0" is set to the ATT values of the base station 200-1 and the base station 200-2.

The time interval analyzer 3 measures a difference between time ta when the base station 200-2 senses an impulse and time tb when the base station 200-1 transmits an impulse.

Under the configuration, the base station 200-1 continuously transmits impulses to the base station 200-2. In order to facilitate the measurement, an interval that the base station 200-1 transmits impulses is desirably longer than the time in which the base station 200-2 senses an impulse transmitted by the base station 200-1.

An ATT value when the base station 200-2 reaches reception limit is detected by changing the ATT value of the variable ATT2. An amount of 12 dB is subtracted from the detected ATT value and the obtained value is set to the ATT value of the variable ATT2, and measures "ta-tb." The base station 200 is adjusted so that the measured "ta-tb" becomes 0 in order to assume the value of the "ta-tb" as a standard. The relationship between the sensing margin and the sensing error differential time is calculated as illustrated in FIG. 7 by measuring "ta-tb" while changing the ATT value of the variable ATT2.

In the above description, a sensing margin of 12 dB is assumed to be a standard value; however, another sensing margin may be used as the standard value. For example, the sensing limit may be a standard value or a sensing margin of 6 dB may be a standard value.

The information that indicates the relationship between the calculated sensing margin and the sensing error differential time is stored in respective base stations 200. As described above, when the difference between the reception limit field intensity and the sensing margin is constant, the sensing error differential time is substantially the same. Thus, the relationship between the sensing margin and the sensing error differential time may not be calculated for each of the stations.

Figure 9:
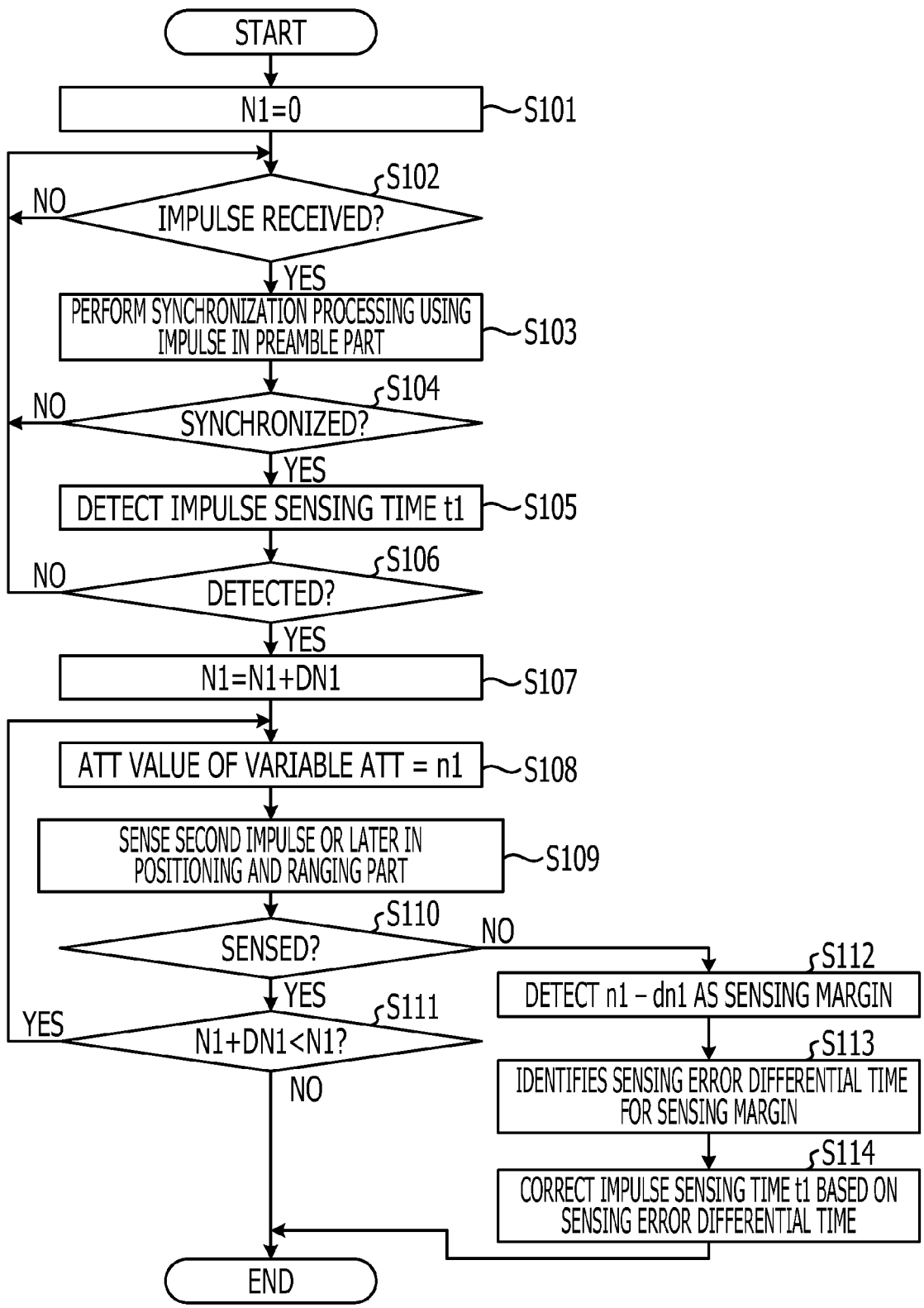
FIG. 9 is a flow chart illustrating processing procedures by a base station according to the second embodiment.

FIG. 9 is a flow chart illustrating processing procedures by the base station 200 according to the second embodiment.

As illustrated in FIG. 9, the sensing margin detection unit 252 of the base station 200 initializes a variable "n1" to "0" (Operation S101). The sensing margin detection unit 252 sets "n1" to the ATT value of the variable ATT242. In other words, the sensing margin detection unit 252 sets 0 to the ATT value of the variable ATT242.

The reception unit 240 of the base station 200 performs synchronization processing using an impulse in a preamble part (Operation S103) when the reception unit 240 of the base station 200 receives an impulse transmitted by the mobile station 20 (Operation S102: Yes). The impulse sensing unit 243 senses an impulse in the positioning and ranging part.

When the synchronization process completes (Operation S104: Yes), the initial detection unit 251 detects time when the impulse sensing unit 243 senses the impulse and stores the impulse sensing time "t1" (Operation S105).

When the impulse may be detected (Operation S106: Yes), the sensing margin detection unit 252 adds a constant value "dn1" to the variable "n1" (Operation S107). The sensing margin detection unit 252 sets the variable "n1" to the ATT value of the variable ATT 242 (Operation S108). In other words, the sensing margin detection unit 252 sets "0+dn1" to the ATT value of the variable ATT 242.

The impulse sensing unit 243 senses an impulse in the positioning and ranging part attenuated by the variable ATT 242 (Operation S109). When the impulse sensing unit 243 senses the impulse (Operation S110: Yes), the sensing margin detection unit 252 adds a constant value "dn1" to the variable "n1" and determines whether or not the obtained value is smaller than a threshold value N1 (Operation S111).

When the obtained value is not "n1+dn1<N1" (Operation S111: No), the base station 200 ends the processing. When the obtained value is "n1+dn1<N1" (Operation S111: Yes), the sensing margin detection unit 252 sets a variable "n1" to the ATT value of the variable ATT242 (Operation S108).

The base station 200 repeats processing procedures in the operations S107 to S111 when the impulse sensing unit 243 senses an impulse (Operation S110: Yes).

When the impulse sensing unit 243 does not sense an impulse (Operation S110: No), the sensing margin detection unit 252 detects the sensing margin (Operation S112). For example, the sensing margin detection unit 252 detects a value obtained by subtracting dn1 from the ATT value n1 of the variable ATT 242 when the impulse sensing unit 243 does not sense an impulse as a sensing margin.

The correction unit 253 identifies the sensing error differential time for the sensing margin calculated by the sensing margin detection unit 252 based on the relationship between the sensing margin and the sensing error differential time (Operation S113). The correction unit 253 corrects the impulse sensing time t1 using the sensing error differential time identified at the operation S113 (Operation S114).

The base station 200 receives a second impulse or later in the positioning and ranging part and receives an impulse in the data body part. The base station 200 may receive an impulse of the positioning and ranging part by gradually attenuating the impulse or may discard the impulse in the positioning and ranging part.

As described above, in the radio positioning and ranging system SY2 according to the second embodiment, the base station 200 detects the sensing margin that is the difference between the field intensity of the received impulse and reception limit the field intensity. The base station 200 identifies the sensing error differential time for the sensing margin based on relationship between the sensing margin and the sensing error differential time and corrects the impulse sensing time using the identified sensing error differential time. The positioning server 1 performs positioning and ranging using the impulse sensing time corrected by each station. Accordingly, the radio positioning and ranging system SY2 according to the second embodiment may perform positioning and ranging with high accuracy when TDOA method is employed.

According to the above described second embodiment, an example in which an impulse in the positioning and ranging part included in one frame is gradually attenuated. However, the mobile station 20 may transmit a plurality of frames to the base station 200 and the sensing margin may be detected by gradually attenuating impulses for each frame by the base station 200.

Figure 10:
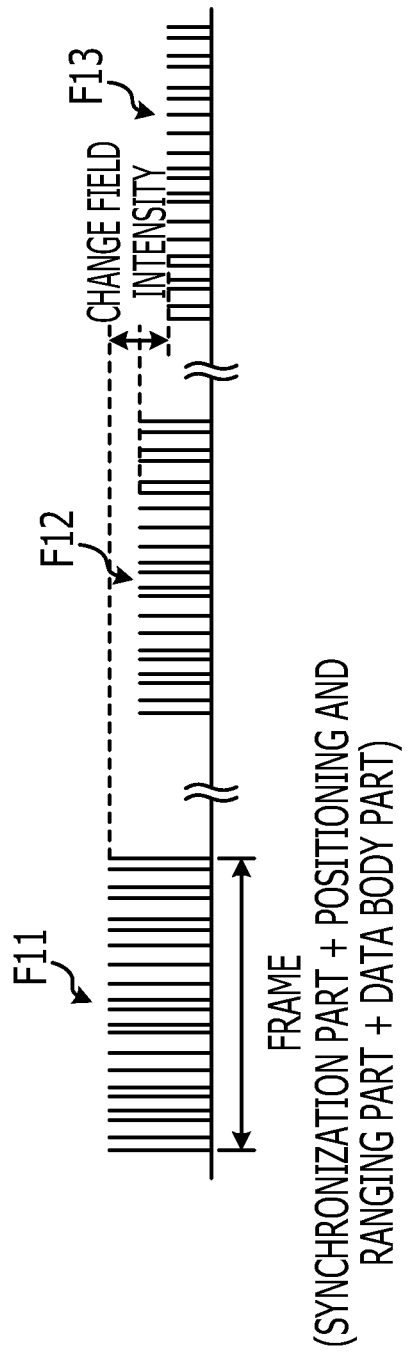
FIG. 10 illustrates an example of a frame that is attenuated by the base station.

Specific explanation will be made by referring to FIG. 10. FIG. 10 illustrates an example of a frame that is attenuated by the base station 200. In the example illustrated in FIG. 10, the base station 200 receives a plurality of frames from the mobile station 20 and may attenuate impulses for each frame. For example, the base station 200 does not attenuate a frame F11 that is received first from the mobile station 20. The base station 200 attenuates a frame F12 that is received subsequently from the mobile station 20 and may attenuate a frame F13 more than the frame F12. In this way, the base station 200 attenuates the impulses for each frame and determines whether or not the attenuated impulse may be detected and thereby may detect the sensing margin. As described above, attenuating the impulses for each frame is effective, for example, when performing attenuation for each impulse in one frame is difficult.

Third Embodiment

In the above described second embodiment, one example is described in which the base station 200 detects reception limit field intensity by gradually attenuating the received impulse. However, the mobile station may transmit gradually attenuated impulses and the base station 200 may detect reception limit field intensity. Accordingly, the third embodiment will describe an example in which a mobile station transmits gradually attenuated impulses.

Figure 11:
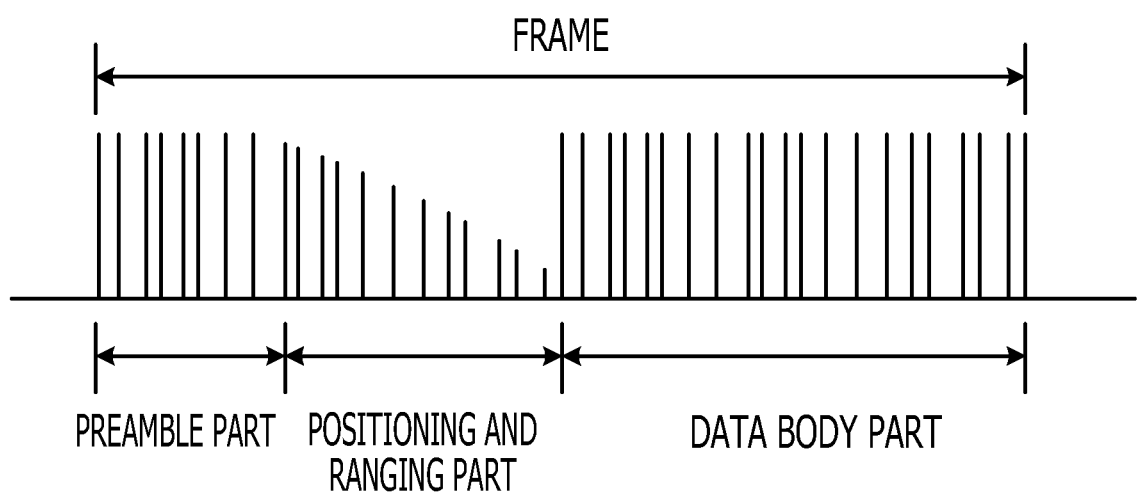
FIG. 11 illustrates an example of a frame that is transmitted by a mobile station according to a third embodiment.

FIG. 11 illustrates an example of a frame that is transmitted by a mobile station 30 according to a third embodiment. As in the example illustrated in FIG. 11, a mobile station 30 according to the third embodiment transmits a frame that includes a plurality of impulses with different field intensity to a base station 200. For example, the mobile station 30 gradually attenuates the field intensity of an impulse in a positioning and ranging part. The base station 200 that receives the frame may detect a sensing margin without attenuating the impulse in the positioning and ranging part.

Figure 12:
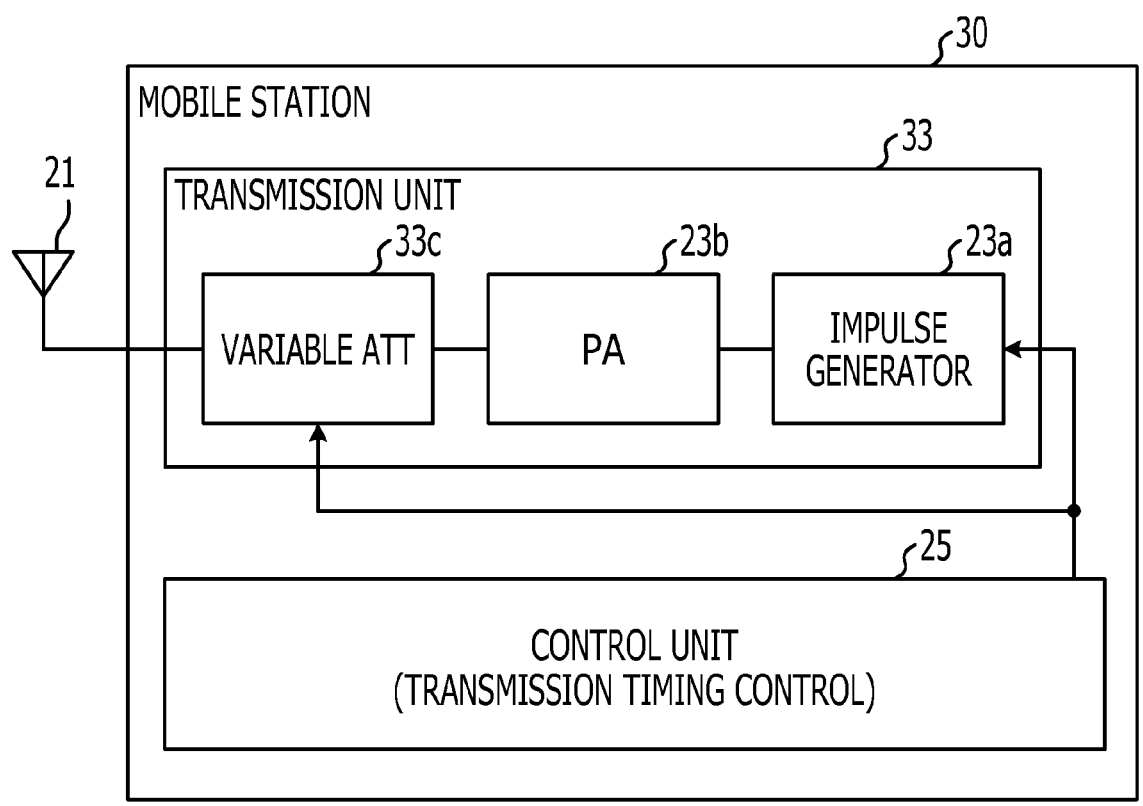
FIG. 12 illustrates a configuration example of the mobile station according to the third embodiment.

A configuration of the mobile station 30 according to the third embodiment will be described by referring to FIG. 12. FIG. 12 illustrates a configuration example of the mobile station 30 according to the third embodiment. As illustrated in FIG. 3, the mobile station 30 according to the third embodiment may include an antenna 21, a control unit 25, and a transmission unit 33. Hereinafter, the same reference numeral will be applied to a component with a function substantially the same as the function of the above described component and the explanation will be omitted.

A transmission unit 33 may include an impulse generator 23a, a power amplifier (PA) 23b, and a variable ATT33c. The variable ATT33c gradually attenuates an impulse that is output from the PA23b. For example, the variable ATT33c attenuates an impulse in the positioning and ranging part as in the example illustrated in FIG. 11. The control unit 25 determines an ATT value set to the variable ATT33c.

The base station according to the third embodiment may be a configuration that is substantially the same as the configuration of the base station 200 illustrated in FIG. 5, or the configuration of the base station 200 illustrated in FIG. 5 from which the variable ATT242 is removed. The base station according to the third embodiment does not attenuate an impulse even when the variable ATT 242 is provided, thus, the ATT value of the variable ATT 242 is almost always set to "0."

As described above, the mobile station 30 according to the third embodiment transmits a frame that includes a plurality of impulses with different field intensity to the base station 200. Accordingly, the base station 200 may detect a sensing margin without attenuating an impulse in the positioning and ranging part.

The mobile station 30 according to the third embodiment may transmit gradually attenuated impulses together with data that indicates the field intensity of the impulses. Thus, the base station 200 may detect a sensing margin without detecting the field intensity of each impulse.

Instead of gradually attenuating an impulse in one frame, the mobile station 30 according to the third embodiment may gradually attenuate field intensity of impulses for each frame as illustrated in the example in FIG. 10. Hence, the mobile station 30 may transmit impulses with field intensity that is gradually attenuated to the base station even when attenuating for each impulse in one frame is difficult.

Fourth Embodiment

According to the second embodiment and the third embodiment, examples in which the positioning and ranging system described in the first embodiment is applied to the positioning and ranging system that employs the TDOA method. However, the positioning and ranging system described in the first embodiment may also be applied to Two Way Ranging (TWR) positioning and ranging system and Time Of Arrival (TOA) positioning method that combines a plurality of the TWR positioning and ranging systems. Thus, in the fourth embodiment, an example in which the positioning and ranging system described in the first embodiment is applied to the TWR positioning and ranging method and the TOA positioning method will be described.

Figure 13:
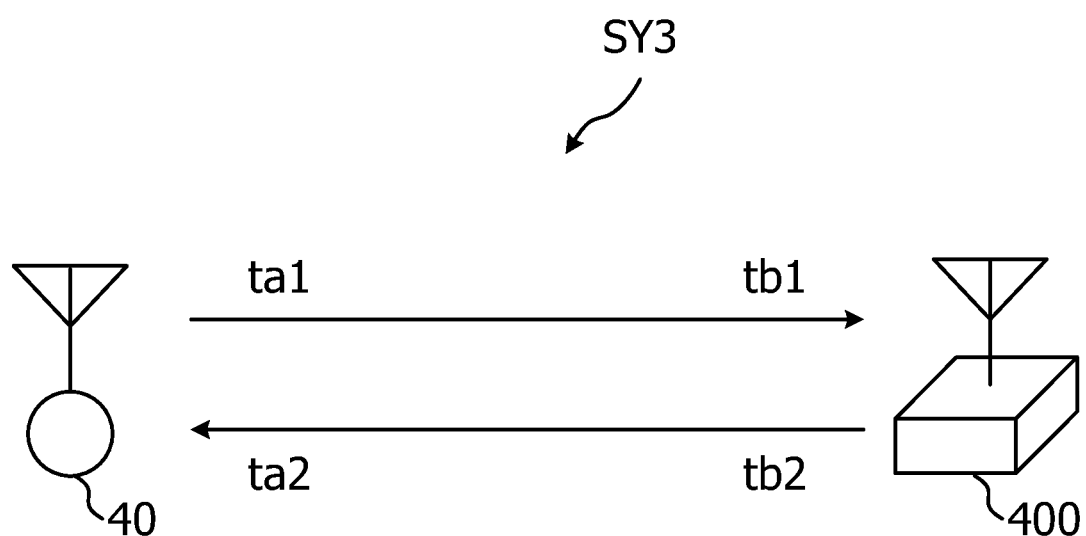
FIG. 13 illustrates a configuration example of a radio positioning and ranging system according to a fourth embodiment.

FIG. 13 illustrates a configuration example of a radio positioning and ranging system according to a fourth embodiment. The example assumes that the mobile station has positional information of each base station and the mobile station calculates the position. It is assumed that the radio positioning and ranging system SY3 illustrated in FIG. 13 employs TWR ranging method.

As illustrated in FIG. 13, the radio positioning and ranging system SY3 may include a mobile station 40 and a base station 400. The mobile station 40 transmits an impulse to the base station 400. In response to the impulse transmitted from the mobile station 40, the base station 400 transmits an impulse to the mobile station 40. In the radio positioning and ranging system SY3, a distance between the mobile station 40 and the base station 400 is calculated based on a reciprocation time of the impulses sent and received between the mobile station 40 and the base station 400.

In the example illustrated in FIG. 13, the mobile station 40 may transmit an impulse at time ta1. Moreover, the base station 400 may sense the impulse transmitted from the mobile station 40 at time tb1. The base station 400 transmits an impulse after a given time elapses from the time tb1. In the example illustrated in FIG. 13, the base station 400 may transmit the impulse at time tb2. The mobile station 40 may sense the impulse transmitted from the base station 400 at time ta2. In the example illustrated in FIG. 13, the mobile station 40 performs ranging based on a difference between the time ta2 and ta1.

The above described given time may be the time determined so that an error does not cause in ranging processing, and for example, the time obtained by adding a margin to time for processing of receiving and transmitting impulses.

Time tb1 that is the time the base station 400 senses an impulse changes depending on field intensity of an impulse transmitted by the mobile station 40. Moreover, time ta2 that is the time the mobile station 40 senses an impulse changes depending on field intensity of an impulse transmitted by the base station 400. In the radio positioning and ranging system SY3 that employs the TWR ranging method, both the mobile station 40 and the base station 400 correct a impulse sensing time.

For example, when the base station 400 receives an impulse from the mobile station 40, the base station 400 detects a sensing margin that is a difference between a field intensity of the sensed impulse and a reception limit field intensity of the base station 400. The base station 400 identifies a sensing error differential time for the detected sensing margin based on the relationship between the sensing margin and the sensing error differential time. The base station 400 corrects the time to transmit an impulse to the mobile station 40 using the identified sensing error differential time.

Figure 14:
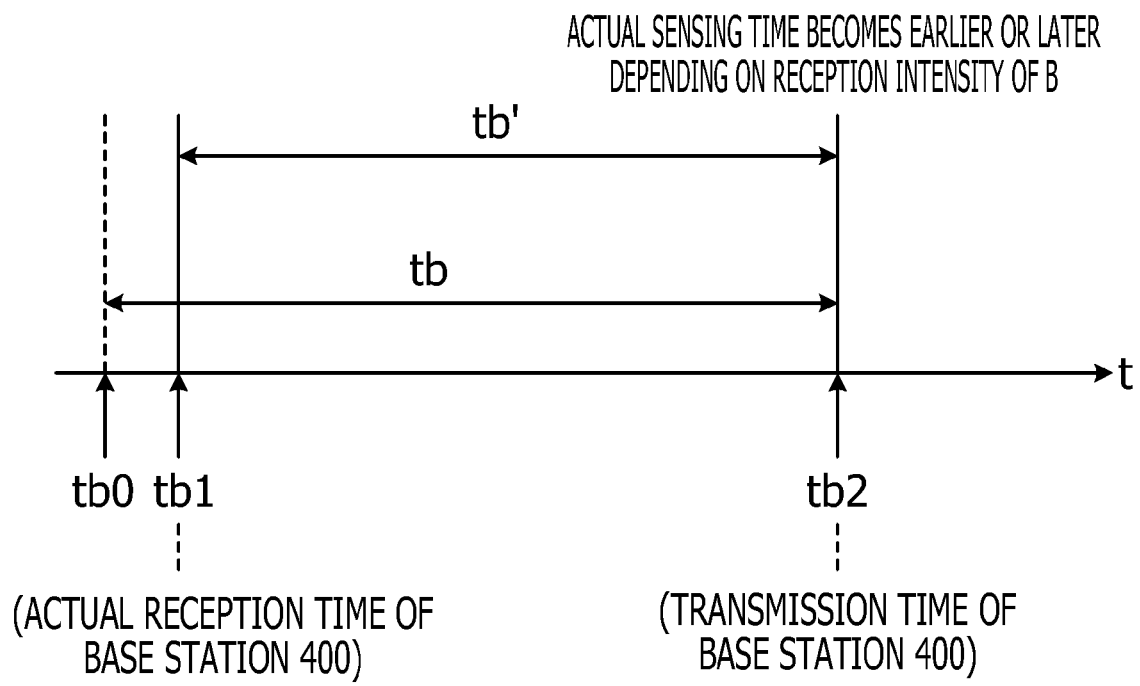
FIG. 14 illustrates an example of a correction processing by a base station according to the fourth embodiment.

FIG. 14 illustrates an example of correction processing by the base station 400 according to the fourth embodiment. The base station 400 is assumed to retain information that indicates the relationship between the sensing margin and the sensing error differential time illustrated in FIG. 7. In other words, the base station 400 is assumed to be set and manufactured so that the sensing error differential time is not caused when a sensing margin is 12 dB.

In the example illustrated in FIG. 14, the base station 400 may sense an impulse transmitted from the mobile station 40 at time tb1. When a sensing margin is 12 dB, the base station 400 senses an impulse at time tb0 indicated in FIG. 14. In other words, in the example illustrated in FIG. 14, the base station 400 senses an impulse at time tb1 that is later than when the sensing margin is 12 dB. Thus, the base station 400 identifies the sensing error differential time in a positive value as in the example illustrated in FIG. 7.

In this case, the base station 400 performs transmission processing assuming that the impulse is sensed at time tb0. For example, the base station 400 transmits an impulse to the mobile station 40 when a given time tb elapses from the time tb0. In other words, the base station 400 corrects the given time tb to tb' using the sensing error differential time that is identified based on the relationship between the sensing margin and the sensing error differential time and transmits an impulse to the mobile station 40 when time tb' elapses from the time tb1.

When the mobile station 40 receives an impulse from the base station 400, the mobile station 40 detects the sensing margin that is a difference between the field intensity of the sensed impulse and the reception limit field intensity of the mobile station 40. The mobile station 40 identifies sensing error differential time for the detected sensing margin based on the relationship between the sensing margin and the sensing error differential time and corrects the impulse sensing time ta2 using the identified sensing error differential time.

Figure 15:
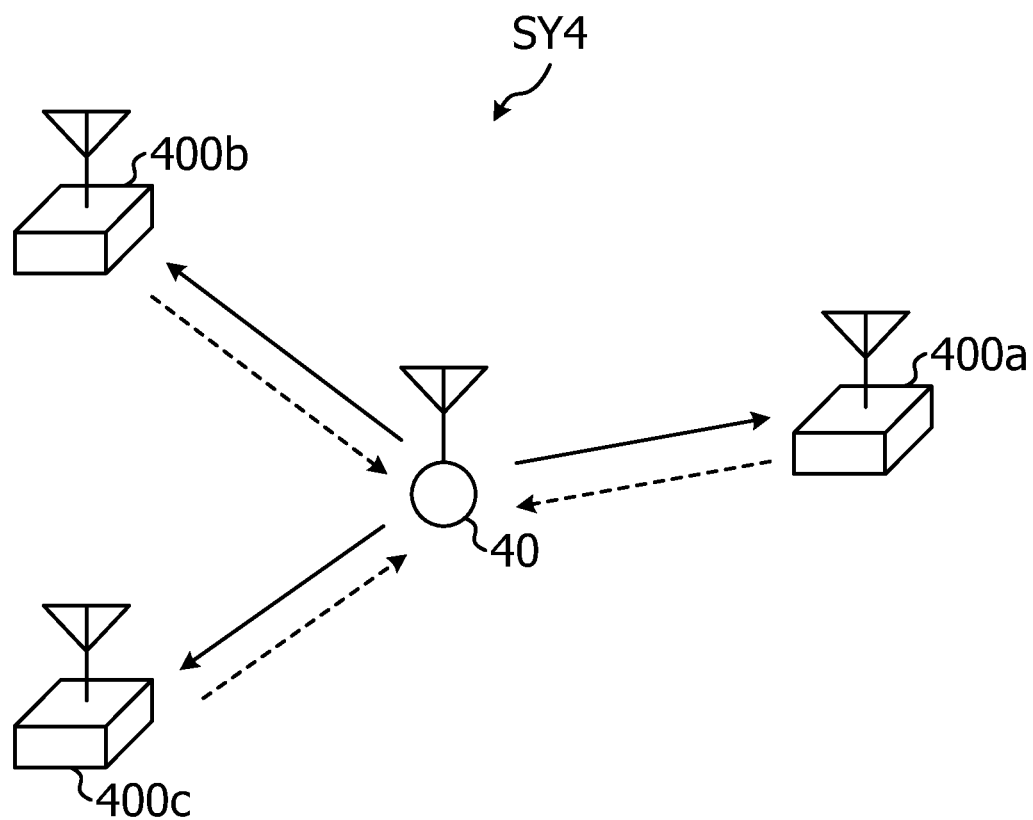
FIG. 15 illustrates a configuration example of a radio positioning and ranging system according to the fourth embodiment.

The radio positioning and ranging system that employs the TOA positioning system is obtained by combining a plurality of the radio positioning and ranging systems SY3. FIG. 15 illustrates a configuration example of a radio positioning and ranging system according to the fourth embodiment. The radio positioning and ranging systems SY4 illustrated in FIG. 15 employs the TOA positioning method and may include a mobile station 40 and base stations 400*a* to 400*c*.

The mobile station 40 transmits impulses to the base stations 400*a* to 400*c*. The mobile station 40 corrects the impulse sensing time when the mobile station 40 receives the impulses transmitted from the base stations 400*a* to 400*c*.

The base stations 400*a* to 400*c* correct the time to transmit impulse to the mobile station 40 when the base stations 400*a* to 400*c* receive the impulses transmitted from the mobile station 40 as in the processing described by referring to FIG. 14.

As described above, in the radio positioning and ranging system according to the fourth embodiment, the base station 400 corrects the time to transmit an impulse to the mobile station 40 and the mobile station 40 corrects the impulse sensing time at which the impulse transmitted by the base station 400 is sensed. Accordingly, the radio positioning and ranging system according to the fourth embodiment may achieve positioning and ranging with high accuracy.

Figure 16:
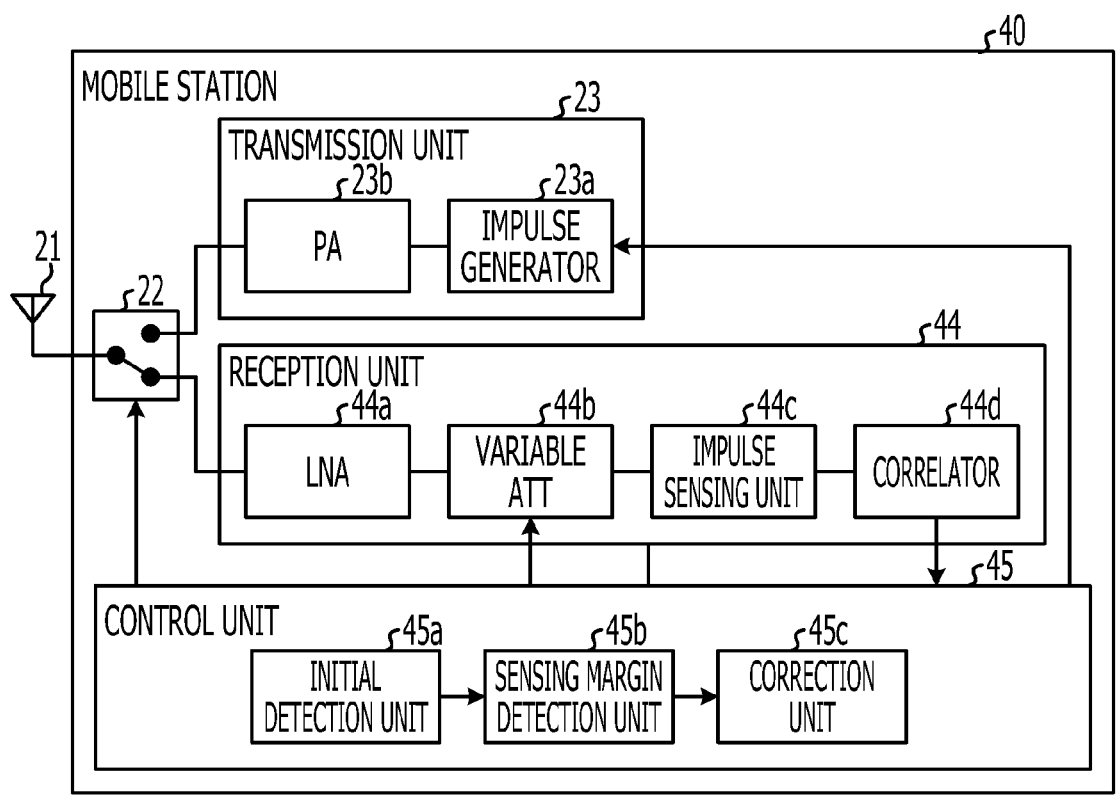
FIG. 16 illustrates a configuration example of a mobile station according to the fourth embodiment.

FIG. 16 illustrates a configuration example of the mobile station 40 according to the fourth embodiment. As illustrated in FIG. 16, the mobile station 40 according to the fourth embodiment may include an antenna 21, a switch 22, a transmission unit 23, a reception unit 44, and a control unit 45.

The reception unit 44 may include a low noise amplifier (LNA) 44*a*, a variable attenuator (ATT) 44*b*, an impulse sensing unit 44*c*, and a correlator 44*d*. The LNA44*a*, the variable ATT44*b*, the impulse sensing unit 44*c*, and a correlator 44*d* perform substantially the same processing as the processing of the LNA 241, the variable ATT242, the impulse sensing unit 243, and the correlator 244.

For example, the LNA44*a* amplifies an impulse received from the base station 400. The variable ATT44*b* attenuates the field intensity of an impulse. The impulse sensing unit 44*c* senses an impulse. The correlator 44*d* performs synchronization processing based on an impulse in a preamble part.

The control unit 45 may include an initial detection unit 45*a*, a sensing margin detection unit 45*b* and a correction unit 45*c*. The initial detection unit 45*a*, the sensing margin detection unit 45*b* and the correction unit 45*c* perform substantially the same processing as the processing of the initial detection unit 251, the sensing margin detection unit 252 and the correction unit 253 illustrated in FIG. 5.

For example, the initial detection unit 45*a* detects the impulse sensing time of an impulse sensed by the impulse sensing unit 44*c* among impulses transmitted by the base station 400.

The sensing margin detection unit 45*b* detects a sensing margin that is a difference between the field intensity of an impulse for which the impulse sensing time is detected by the initial detection unit 45*a* and the reception limit field intensity of the mobile station 40. The sensing margin detection unit 45*b* detects a sensing margin by gradually increasing an ATT value of the variable ATT44*b* as in the sensing margin detection unit 252 illustrated in FIG. 5.

The correction unit 45c identifies the sensing error differential time for the sensing margin detected by the sensing margin detection unit 45b and corrects the impulse sensing time detected by the initial detection unit 45a using the identified sensing error differential time.

A configuration of the base station 400 according to the fourth embodiment is substantially the same as the configuration of the base station 200 illustrated in FIG. 5. However, processing by a correction unit in the base station 400 differs from the correction unit 253 in the base station 200 illustrated in FIG. 5. In order to distinguish the base station 400 from the base station 200, the correction unit of the base station is referred to as the correction unit 453.

The correction unit 453 identifies the sensing error differential time for the sensing margin calculated by the sensing margin detection unit 252 based on the relationship between the sensing margin and the sensing error differential time. The correction unit 453 corrects the time to transmit an impulse to the mobile station 40 using the identified sensing error differential time.

Explanation will be made using the example illustrated in FIG. 14. For example, the correction unit 453 corrects a given time tb to time tb' using the identified sensing error differential time. The control unit 250 controls the transmission unit 230 so that an impulse is transmitted to the mobile station 40 after the time tb' corrected by the correction unit 453 elapses from the impulse sensing time detected by the initial detection unit 251.

As described above, in the radio positioning and ranging system according to the fourth embodiment, the base station 400 corrects the time to transmit an impulse to the mobile station 40, and the mobile station 40 corrects the impulse sensing time at which the impulse transmitted by the base station 400 is sensed. Accordingly, the radio positioning and ranging system according to the fourth embodiment may achieve positioning and ranging with high accuracy when the TWR ranging method and the TOA positioning method are employed.

In the above described fourth embodiment, one example is described in which the mobile station 40 and the base station 400 detect a sensing margin by gradually attenuating the received impulses. However, the mobile station 40 may transmit gradually attenuated impulses as in the example illustrated in FIG. 11, and the base station 400 may detect a sensing margin. Alternatively, the base station 400 may transmit gradually attenuated impulses as in the example illustrated in FIG. 11, and the mobile station 40 may detect a sensing margin. Each of the methods may be achieved by providing a variable ATT at a relevant transmission unit of the mobile station 40 or the base station 400.

According to the fourth embodiment, one example is described in which the time that the base station 400 transmits an impulse to the mobile station 40 is corrected. However, the base station 400 may transmit the sensing error differential time to be corrected to the mobile station 40 without the correcting transmission time. The mobile station 40 may correct the reciprocation time of the impulse using the sensing error differential time received from the base station 400.

Figure 17:
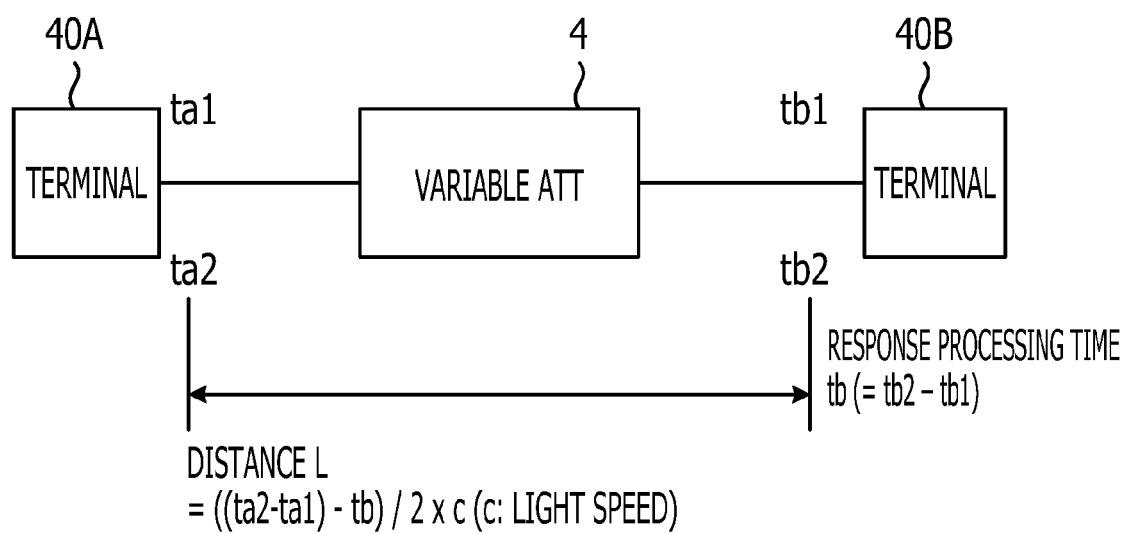
FIG. 17 illustrates an example of calculation for the relationship between the sensing margin and the sensing error differential time.

As in the above described fourth embodiment, when the TWR ranging method and the TOA positioning method are used, the relationship between the sensing margin and the sensing error differential time may be calculated using the TWR ranging method. The explanation will be made by referring to FIG. 17. FIG. 17 illustrates an example of calculation for a relationship between the sensing margin and the sensing error differential time.

In the example illustrated in FIG. 17, when relationship between the sensing margin and the sensing error differential time is calculated, two terminals 40A and 40B are coupled with a wire through a variable ATT4. The terminal 40A may be the mobile station 40, or the base station 400. The terminal 40B may be the mobile station 40, or the base station 400. Note that transmission output and reception sensitivity of the terminal 40A and that of the terminal 40B are assumed to be substantially the same.

Under the configuration, the terminal 40A measures the distance to the terminal 40B. An ATT value when the terminals 40A and 40B reach reception limit is detected by changing an ATT value of the variable ATT4. An amount of 12 dB is subtracted from the calculated ATT value and the obtained value is set as the ATT value of the variable ATT4, and obtains the distance to the terminal 40B measured by the terminal 40A. The time is obtained by dividing the result of ranging processing of the terminal 40A by two times of light speed c. In order to assume the obtained time as a standard, the mobile station 40 and the base station 400 are adjusted so that the value obtained here becomes 0. The relationship between a sensing margin and sensing error differential time illustrated in FIG. 7 is calculated by measuring the time obtained by dividing the result of ranging by the terminal 40A by two times of light speed c while changing the ATT value of the variable ATT4.

Fifth Embodiment

In the above described fourth embodiment, one example is described in which an impulse in a positioning and ranging part included in one frame is attenuated. However, a mobile station may transmit a plurality of frames to a base station, the base station may attenuate impulses for each frame, and a sensing margin may be detected. Alternatively, a base station may transmit a plurality of frames to a mobile station, the mobile station may attenuate impulses for each frame, and a sensing margin may be detected. Moreover, the mobile station acquires the sensing margin of itself and the sensing margin of the base station and may correct a reciprocation time of the impulse, and thereby may perform ranging. In the fifth embodiment, an example will be described in which a mobile station and a base station transmit a plurality of frames and the base station acquires a sensing margin of itself and the sensing margin of the mobile station Overview of a radio positioning and ranging system SY5 according to the fifth embodiment will be described. When a mobile station 50 and a base station 500 according to the fifth embodiment transmit a plurality of frames, the following 1 to 4 may be considered as modes to attenuate a field intensity of impulses.

1. A mobile station 50 transmits impulses with substantially the same field intensity. A base station 500 gradually attenuates the received impulses for each frame.
2. The mobile station 50 transmits impulses by attenuating field intensity of impulses for each frame. The base station 500 does not attenuate the received impulses.
3. The base station 500 transmits impulses with substantially the same field intensity. The mobile station 50 gradually attenuates the received impulses for each frame.
4. The base station 500 transmits impulses by attenuating field intensity of impulses for each frame. The mobile station 50 does not attenuate the received impulses.

In the case of the above described 1, the base station 500 receives a frame transmitted from the mobile station 50, attenuates the field intensity of the impulses for each frame, and detects the sensing margin by determining whether or not the attenuated impulse may be sensed. The base station 500 transmits the detected sensing margin to the mobile station 50.

In the case of the above described 2, the base station 500 receives a frame transmitted from the mobile station 50, and detects the sensing margin by determining whether or not impulses with different field intensity for each frame may be sensed. The mobile station 50 may detect the sensing margin of the base station 500 by determining whether or not the base station 500 transmits an impulse. Alternatively, the base station 500 may detect a sensing margin of itself and may transmit the detected sensing margin to the mobile station 50. Consequently, the mobile station 50 may acquire the sensing margin of the base station 500.

In the case of the above described 3, the mobile station 50 receives a frame transmitted from the base station 500 and attenuates field intensity of impulses for each frame and detects a sensing margin by determining whether or not the attenuated impulses may be sensed.

In the case of the above described 4, the mobile station 50 receives a frame transmitted from the base station 500 and detects a sensing margin by determining whether or not impulses with different field intensity for each frame may be sensed.

Examples that use the above 2 and 3 will be described. In other words, the mobile station 50 detects a sensing margin of the base station 500 by transmitting impulses with field intensity attenuated for each frame. Moreover, the mobile station 50 detects a sensing margin of itself by gradually attenuating impulses received from the base station 500. Processing of the mobile station 50 according to the fifth embodiment will be described in detail by referring to FIG. 19.

Figure 18:
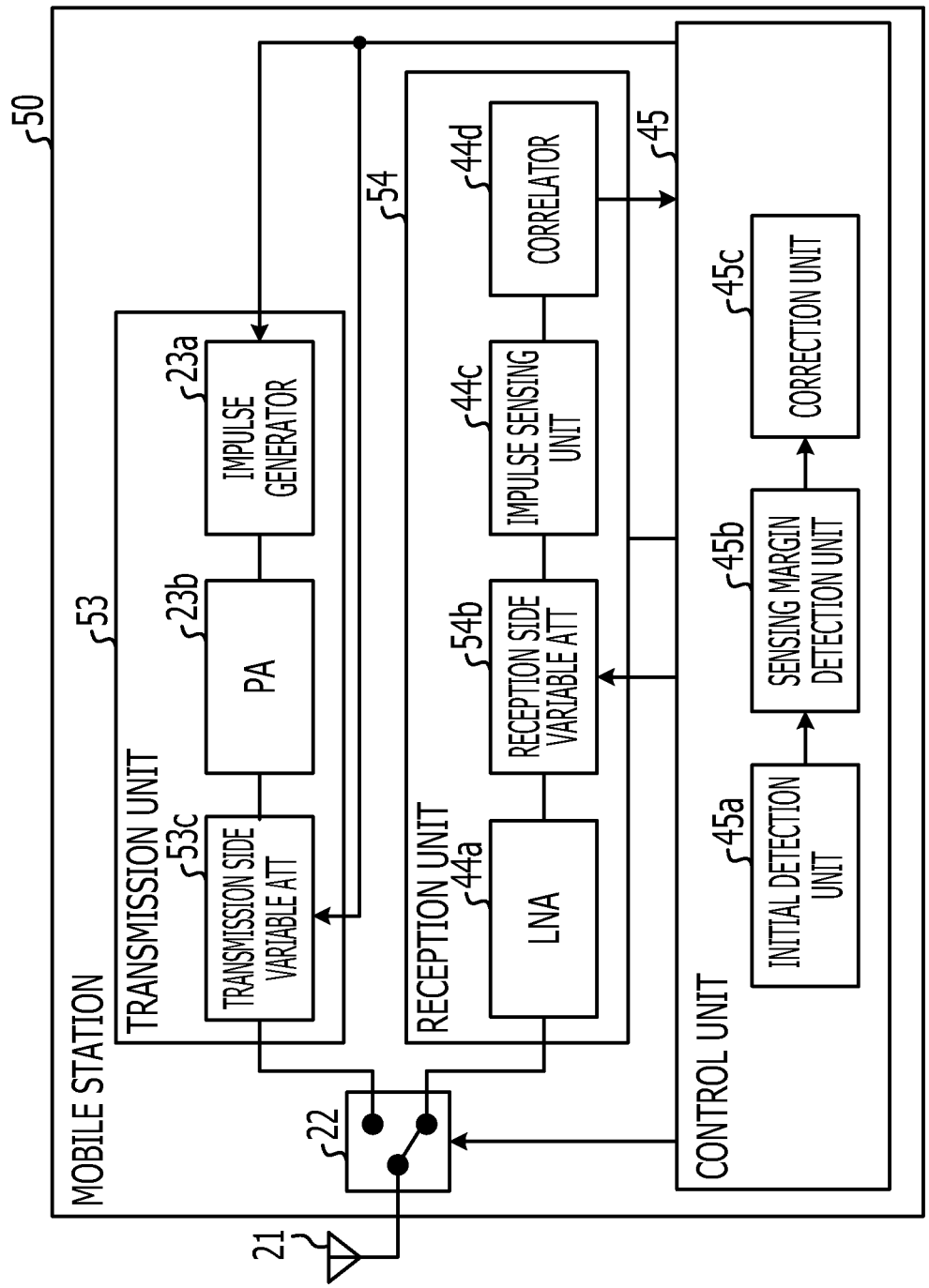
FIG. 18 illustrates a configuration example of a mobile station according to a fifth embodiment.

Now, a configuration of the mobile station 50 according to the fifth embodiment will be described by referring to FIG. 18. FIG. 18 illustrates a configuration example of the mobile station 50 according to the fifth embodiment. As illustrated in FIG. 18, the mobile station 50 according to the fifth embodiment may include an antenna 21, a switch 22, a control unit 45, a transmission unit 53, and a reception unit 54.

The transmission unit 53 may include an impulse generator 23a, a PA 23b, and a transmission side variable ATT53c. The transmission side variable ATT53c attenuates impulses that are output from the PA23b. For example, the transmission side variable ATT53c gradually attenuates impulses for each frame. An ATT value set to the variable ATT53c is determined by the control unit 45.

The reception unit 54 may include a low noise amplifier (LNA) 44a, a reception side variable attenuator (ATT) 54b, an impulse sensing unit 44c, and a correlator 44d. The reception side variable attenuator (ATT) 54b attenuates field intensity of the impulses received from the base station 500 as in the variable ATT44b illustrated in FIG. 16.

Figure 19:
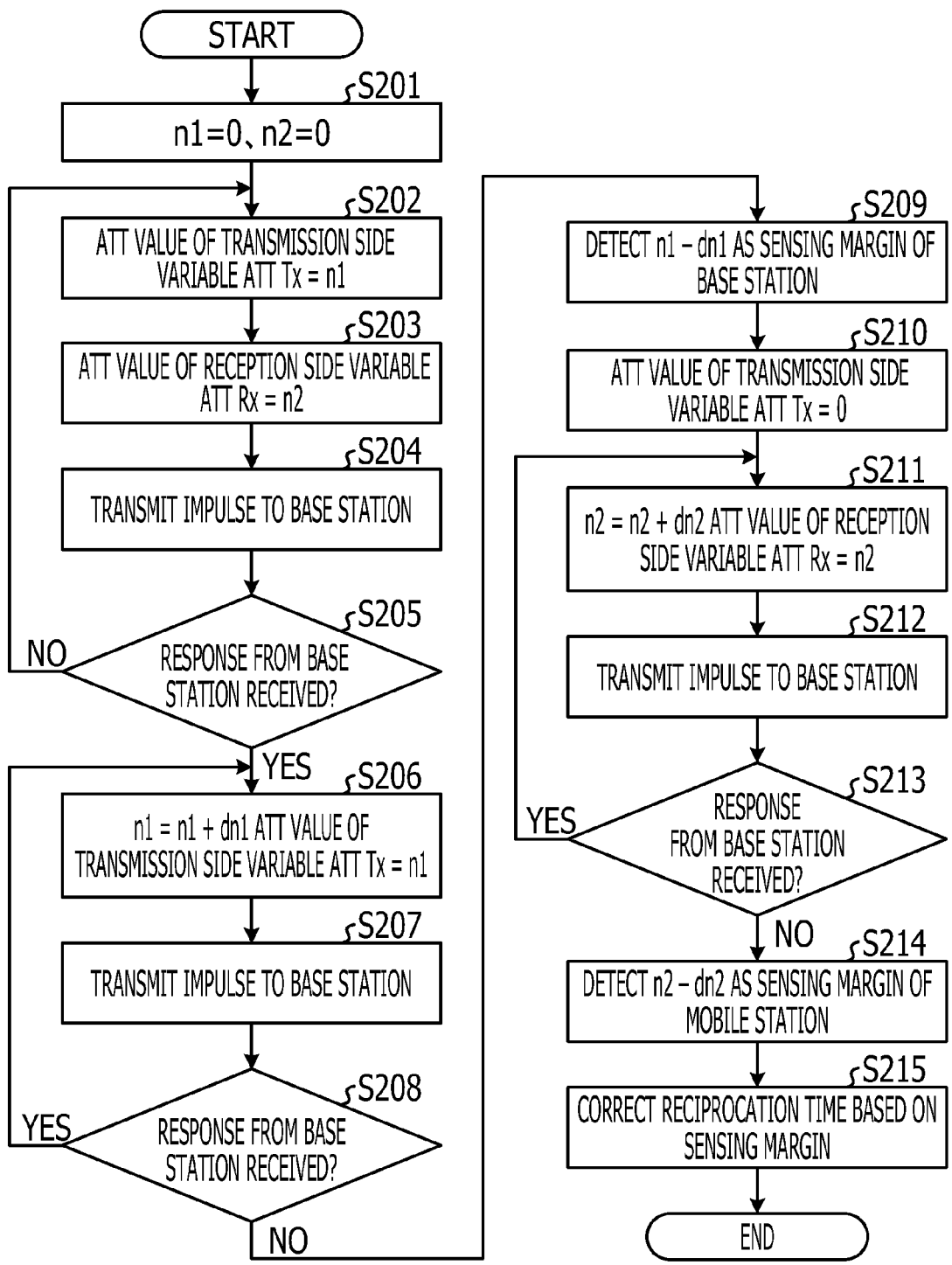
FIG. 19 is a flow chart illustrating processing procedures by the mobile station according to the fifth embodiment.

FIG. 19 is a flow chart illustrating processing procedures by the mobile station 50 according to the fifth embodiment. As illustrated in FIG. 19, the sensing margin detection unit 45b initializes a variable n1 and n2 to 0 (Operation S201). The sensing margin detection unit 45b sets a variable n1 to an ATT value Tx of the transmission side variable ATT53c (Operation S202). Moreover, the sensing margin detection unit 45b sets a variable n2 to an ATT value Rx of the reception side variable ATT54b (Operation S203). In other words, the ATT value Tx of the transmission side variable ATT53c and the ATT value Rx of the reception side variable ATT54b are set to 0.

The transmission unit 53 of the mobile station 50 transmits an impulse to the base station 500 (Operation S204). The control unit 45 of the mobile station 50 stores time ta1 at which the impulse is transmitted.

When the mobile station 50 does not receive an impulse from the base station 500 (Operation S205: No), the mobile station 50 returns to Operation S202 to perform the processing. When the base station 500 transmits an impulse in response to the impulse transmitted at Operation S204 (Operation S205: Yes), the sensing margin detection unit 45b adds a constant value dn1 to the variable n1. The sensing margin detection unit 45b sets a variable n1 to an ATT value Tx of the transmission side variable ATT 53c (Operation S206). At this time, the initial detection unit 45a of the mobile station 50 stores an impulse sensing time ta2 at which the impulse is sensed by the impulse sensing unit 44c.

The transmission unit 53 transmits an impulse to the base station 500 (Operation S207). In other words, the transmission unit 53 transmits the impulse attenuated by the transmission side variable ATT 53c to the base station 500.

When the base station 500 transmits an impulse in response to the impulse transmitted at Operation S207 (Operation S208: Yes), the sensing margin detection unit 45b adds a constant value dn1 to the variable n1 and sets the obtained variable n1 to the ATT value Tx of the transmission side variable ATT 53c (Operation S206).

When the base station 500 transmits an impulse in response to the impulse transmitted at Operation S207 (Operation S208: Yes), the mobile station 50 repeats processing procedures of the Operation S206 and Operation S207. In other words, the mobile station 50 transmits gradually attenuated impulses by gradually increasing the ATT value Tx of the transmission side variable ATT53c.

On the other hand, when the base station 500 does not transmit an impulse without responding to the impulse transmitted at Operation S207 (Operation S208: No), the sensing margin detection unit 45b detects "n1−dn1" as a sensing margin of the base station 500 (Operation S209). The sensing margin detection unit 45b initializes the ATT value Tx of the transmission side variable ATT 53c to 0 (Operation S210).

The sensing margin detection unit 45b adds a constant value dn2 to a variable n2, and sets the obtained variable n2 to an ATT value Rx of the reception side variable attenuator (ATT) 54b (Operation S211). The transmission unit 53 transmits an impulse to the base station 500 (Operation S212).

When an impulse transmitted by the base station 500 in response to the impulse transmitted at Operation S212 is received (Operation S213: Yes), the sensing margin detection unit 45b adds a constant value dn2 to the variable n2, and sets the obtained variable n2 to the ATT value Rx of the reception side variable attenuator (ATT) 54b (Operation S211).

When the mobile station 50 receives an impulse transmitted from the base station 500 in response to the impulse transmitted at Operation S212 (Operation S213: Yes), the mobile station 50 repeats processing procedures of the Operation S211 and Operation S212. In other words, the mobile station 50 receives a gradually attenuated impulse by gradually increasing the ATT value Rx of the reception side variable ATT54b.

On the other hand, when the mobile station 50 does not receive an impulse transmitted from the base station 500 (Operation S213: No), the sensing margin detection unit 45b detects "n2−dn2" as a sensing margin of the mobile station 50 (Operation S214).

The correction unit 45c identifies sensing error differential time ta x for the sensing margin calculated at Operation S209 based on the relationship between the sensing margin and the sensing error differential time and identifies the sensing error differential time ta y for the sensing margin calculated at Operation S214. The correction unit 45c corrects reciprocation time "ta2−ta1" of the impulses that are transmitted and received between the mobile station 50 and the base station 500 (Operation S215). The mobile station 50 measures a distance to the base station 500 based on the corrected reciprocation time.

In FIG. 19, processing procedures of Operations S104, S106, S111, etc., are omitted, however, the mobile station 50 actually performs processing procedures of Operations S104, S106, S111, etc.

As described above, in the radio positioning and ranging system SY5 according to the fifth embodiment, the mobile station 50 detects sensing margins of the mobile station 50 and the base station 500 and corrects the reciprocation time of the impulse. Hence, the radio positioning and ranging system SY5 according to the fifth embodiment may achieve positioning and ranging with high accuracy.

Sixth Embodiment

The radio positioning and ranging system of the present disclosure may be embodied in various modes other than the above described embodiments. Accordingly, the sixth embodiment describes another embodiment of the radio positioning and ranging system, etc., of the present disclosure.

Figure 20:
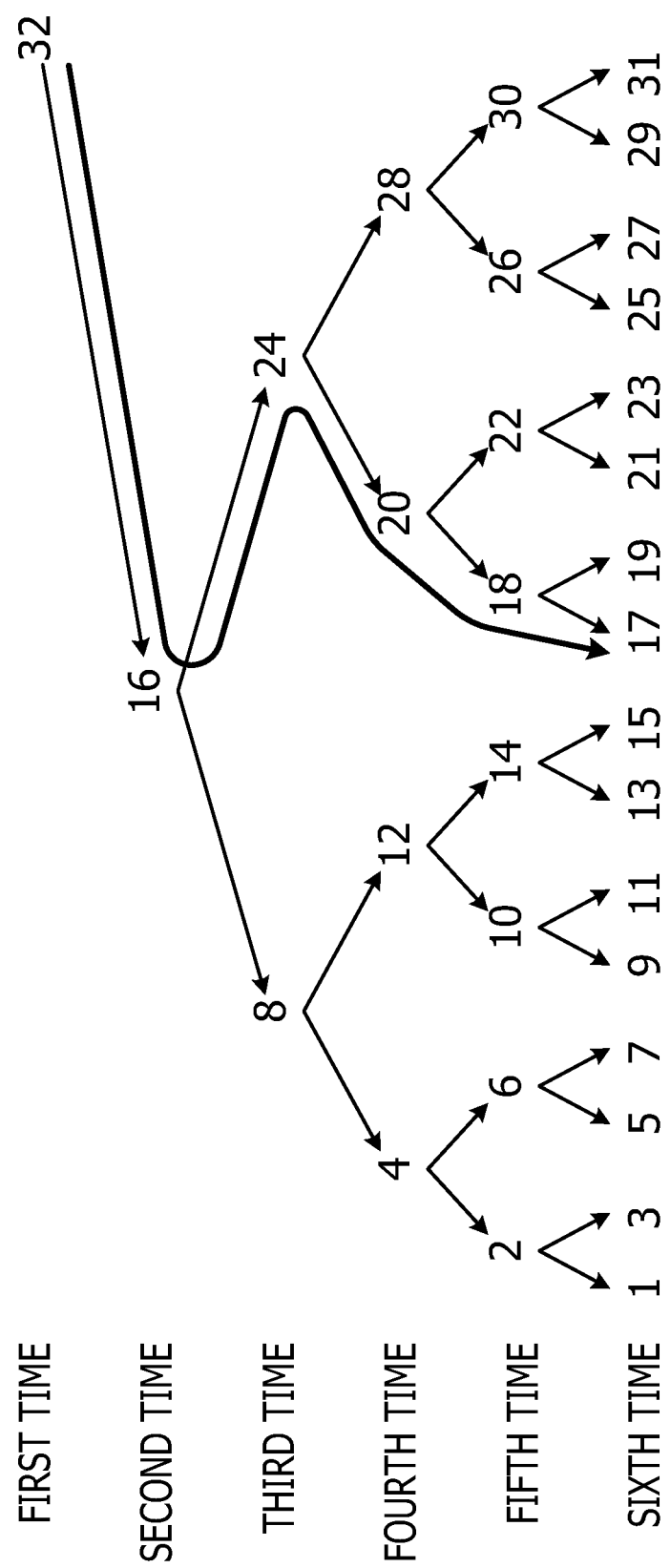
FIG. 20 illustrates an example of processing for detecting a sensing margin using binary search.

According to the above described first to fifth embodiments, sensing margins of the mobile station and the base station are detected by gradually attenuating field intensity of impulses. However, the mobile station and the base station may use binary search for detecting sensing margins. The details will be described by referring to FIG. 20. FIG. 20 illustrates an example of processing for detecting a sensing margin using binary search.

As an example, processing of the base station 200 according to the second embodiment will be described. In the example illustrated in FIG. 20, it is assumed that the base station 200 receives an impulse with field intensity of 32 dBm from the mobile station 20. In this case, the base station 200 attenuates field intensity of the impulse subsequently received from the mobile station 20 to 16 dBm. When the impulse with field intensity that is attenuated to 16 dBm may be sensed, the base station 200 attenuates field intensity of the impulse subsequently received to 8 dBm. On the other hand, when the impulse with field intensity that is attenuated to 16 dBm may not be sensed, the base station 200 attenuates the field intensity of the impulse subsequently received to 24 dBm. Accordingly, the base station 200 may detect a sensing margin with high efficiency by using the binary search.

Various processing of the above described embodiments 1 to 5 may be achieved by executing a given program on a computer such as a personal computer or a workstation. Hereinafter, one example of a computer that executes a positioning and ranging program that provides substantially the same functions as the mobile stations and the base stations according to the above described first to fifth embodiments.

Figure 21:
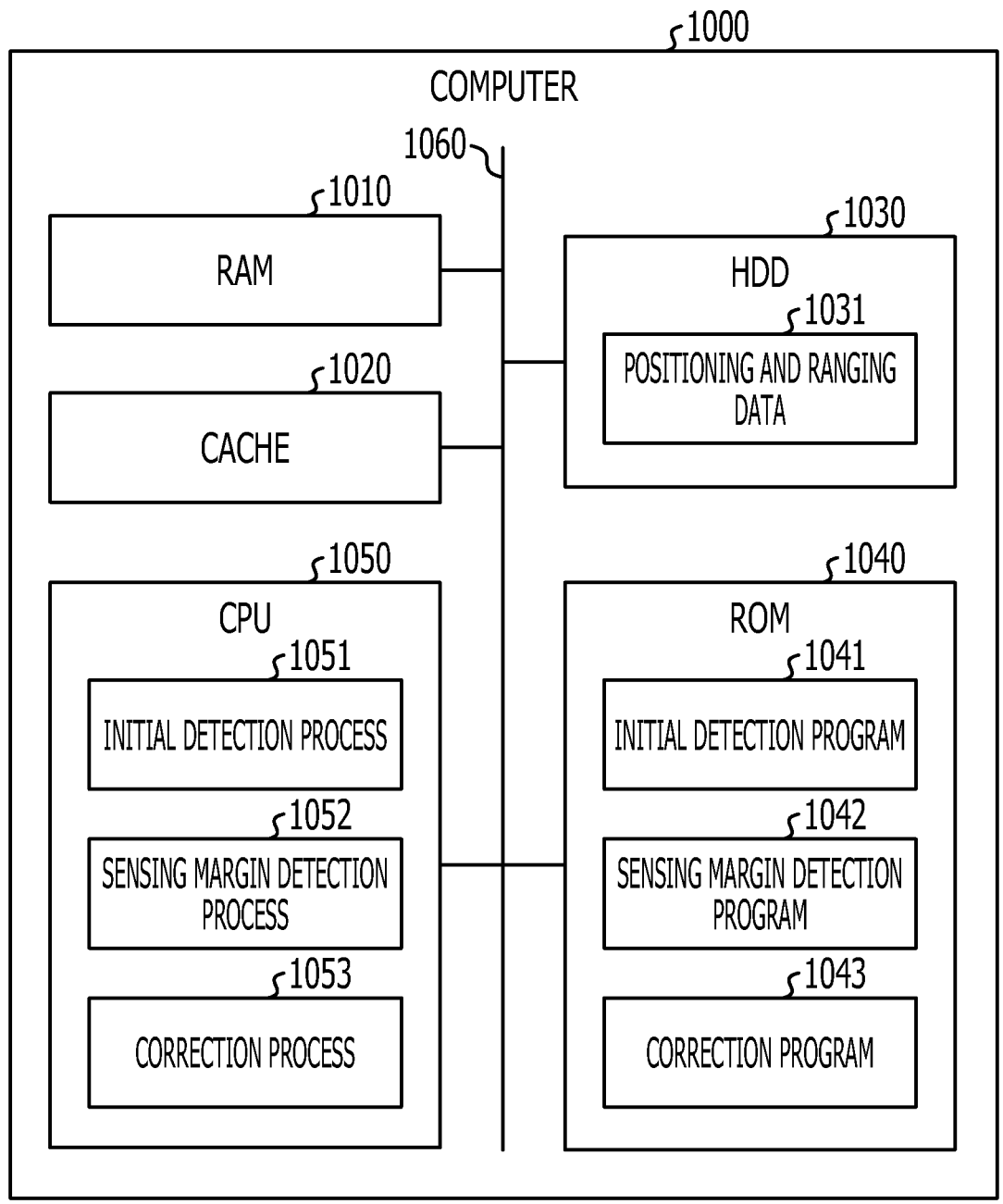
FIG. 21 illustrates a computer that executes a positioning and ranging program.

FIG. 21 illustrates a computer that executes a positioning and ranging program. As illustrated in FIG. 21, a computer 1000 may be coupled to a random access memory (RAM) 1010, a cache 1020, a hard disk drive (HDD) 1030, a read only memory (ROM) 1040, and a central processing unit (CPU) 1050 through a bus 1060.

A positioning and ranging program that provides substantially the same functions as the functions of the control unit 250 and a control unit 45 may be stored in the ROM 1040. For example, an initial detection program 1041, a sensing margin detection program 1042, and a correction program 1043 may be stored in the ROM 1040.

The CPU 1050 reads and executes the initial detection program 1041, the sensing margin detection program 1042, and the correction program 1043. Accordingly, as illustrated in FIG. 21, the initial detection program 1041 turns into an initial detection process 1051. The sensing margin detection program 1042 turns into a sensing margin detection process 1052. The correction program 1043 turns into a correction process 1053.

As illustrated in FIG. 21, the HDD 1030 is provided with positioning and ranging data 1031. Information that indicates a relationship between the sensing margin and a sensing error differential time, etc., as illustrated in FIG. 7 is stored in the positioning and ranging data 1031.

Each of the above described programs 1041 to 1043 may not be necessarily stored in the ROM 1040. For example, the program 1041, etc., may be stored in a "portable physical medium" that is inserted into the computer 1000, such as a floppy disk (FD), CD-ROM, a Magneto-Optical (MO) disc, a digital versatile disc (DVD), and an integrated circuit (IC) card. Alternatively, the program 1041, etc., may be stored in "fixed physical medium" provided internal or external of the computer 1000 such as a hard disk drive (HDD). Alternatively, the program 1041, etc., may be stored in another computer (or server) that is coupled to the computer 1000 through a public network, the Internet, a local area network (LAN), or a wide area network (WAN). The computer 1000 may read and execute each program from the above described floppy disk, etc.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A positioning and ranging system comprising:
a transmitter that transmits a plurality of impulses; and
a receiver that receives the plurality of impulses;
wherein, the receiver includes:
  a memory, and
  a processor coupled to the memory and configured to:
    record a sensing time of a first impulse among the plurality of impulses transmitted by the transmitter,
    detect a sensing margin that is a difference between a field intensity of the first impulse received and a field intensity reception limit of the receiver,
    identify a sensing error differential time being a timing corresponding with sensing of the first impulse based on the sensing margin detected, and
    correct the sensing time of the first impulse using the identified sensing error differential time,
wherein the positioning and ranging system measures a distance between the transmitter and the receiver and a position of the transmitter based on a time when the transmitter transmits the first impulse and the corrected sensing time,
wherein the transmitter includes:
  a memory, and
  a processor coupled to the memory and configured to:
    transmit a frame that includes a plurality of impulses with substantially the same intensity, and wherein the processor of the receiver is configured to:
attenuate the field intensity of each of the plurality of impulses in the frame so that the field intensity of each of the plurality of impulses is different from attenuated intensities of other impulses included in the frame transmitted, and
detect the sensing margin based on the plurality of impulses attenuated within the frame.

2. The positioning and ranging system according to claim 1, wherein
the first impulse is an impulse that is first detected from among the plurality of impulses.

3. The positioning and ranging system according to claim 1, wherein
the given relationship between the sensing margin and the sensing error differential time is obtained by using the transmitter, the receiver, and a cable and an attenuator that are coupled between the transmitter and the receiver.

4. The positioning and ranging system according to claim 1, comprising
an apparatus including:
a memory, and
a processor coupled to the memory and configured to:
correct a sensing time for each of a plurality of receivers based on a measured distance between a plurality of receivers and a position of the transmitter.

5. The positioning and ranging system according to claim 1,
wherein different sensing error differential times are identified and stored in the receiver based on changes to the sensing margin.

6. The positioning and ranging system according to claim 1 herein the field intensity reception limit set for the receiver indicates a threshold for detecting a field intensity of an impulse by the receiver.

7. A positioning and ranging system comprising:
a transmitter that transmits a plurality of impulses; and
a receiver that receives the plurality of impulses;
wherein, the receiver includes:
a memory, and
a processor coupled to the memory and configured to:
record a sensing time of a first impulse among the plurality of impulses transmitted by the transmitter,
detect a sensing margin that is a difference between a field intensity of the first impulse received and a field intensity reception limit of the receiver,
identify a sensing error differential time being a timing corresponding with sensing of the first impulse based on the sensing margin detected, and
correct the sensing time of the first impulse using the identified sensing error differential time,
wherein the positioning and ranging system measures a distance between the transmitter and the receiver and a position of the transmitter based on a time when the transmitter transmits the first impulse and the corrected sensing time,
wherein the transmitter includes:
a memory, and
a processor coupled to the memory and configured to:
transmit a plurality of frames that each include a plurality of impulses with substantially the same field intensity to the receiver,
wherein the processor of the receiver is configured to:
detect the sensing margin by attenuating impulses over the plurality of frames.

* * * * *